US012474569B2

(12) United States Patent
Seto et al.

(10) Patent No.: US 12,474,569 B2
(45) Date of Patent: Nov. 18, 2025

(54) LIGHT DEFLECTOR, ANALYZER, RESIN IDENTIFICATION SYSTEM, AND DISTANCE MEASUREMENT DEVICE

(71) Applicants: Masami Seto, Osaka (JP); Masayuki Fujishima, Kanagawa (JP)

(72) Inventors: Masami Seto, Osaka (JP); Masayuki Fujishima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 976 days.

(21) Appl. No.: 17/504,507

(22) Filed: Oct. 19, 2021

(65) Prior Publication Data
US 2022/0137398 A1  May 5, 2022

(30) Foreign Application Priority Data

Oct. 30, 2020 (JP) .................. 2020-182635
Sep. 3, 2021 (JP) .................. 2021-144079

(51) Int. Cl.
G02B 26/08 (2006.01)
G01N 21/3563 (2014.01)
G01N 33/44 (2006.01)
G01S 7/481 (2006.01)
G01S 17/08 (2006.01)
(Continued)

(52) U.S. Cl.
CPC ..... *G02B 26/0833* (2013.01); *G01N 21/3563* (2013.01); *G01N 33/442* (2013.01); *G01S 7/4817* (2013.01); *G01S 17/08* (2013.01); *G01S 17/931* (2020.01); *G02B 7/1821* (2013.01);
(Continued)

(58) Field of Classification Search
CPC ............ G02B 26/0833; G02B 26/0858; B81B 3/0035–0064
See application file for complete search history.

(56) References Cited

U.S. PATENT DOCUMENTS 6,487,001 B2 * 11/2002 Greywall ........... G02B 26/0841
 359/223.1
6,641,273 B1 * 11/2003 Staker .................. B81B 3/0051
 359/224.1
(Continued)

FOREIGN PATENT DOCUMENTS

JP    2000-214407    8/2000
JP    2000258721 A    9/2000
(Continued)

OTHER PUBLICATIONS

Office Action issued Sep. 2, 2025 in corresponding Japanese Patent Application No. 2021-144079.

Primary Examiner — Thomas K Pham
Assistant Examiner — Ruby L Kauffman
(74) Attorney, Agent, or Firm — XSENSUS LLP

(57) ABSTRACT

A light deflector includes a movable portion including a reflector; multiple drive beams supporting the movable portion to allow the movable portion to be oscillatable; at least one supporting part supporting the multiple drive beams, the at least one supporting part including a first connecting portion and a second connecting portion different from the first connecting portion; and a stopper having one end connected to the first connecting portion and the other end connected to the second connecting portion on the at least one supporting part to be contactable with and straddle the multiple drive beams.

20 Claims, 20 Drawing Sheets

(51) Int. Cl.
*G01S 17/931* (2020.01)
*G02B 7/182* (2021.01)

(52) U.S. Cl.
CPC . *G02B 26/0858* (2013.01); *G01N 2201/0636* (2013.01)

(56) References Cited

U.S. PATENT DOCUMENTS

| | | | |
|---|---|---|---|
| 2011/0188104 A1* | 8/2011 | Tachibana | G02B 26/0841 310/309 |
| 2017/0146792 A1* | 5/2017 | Straub | B81B 3/0051 |
| 2017/0350759 A1 | 12/2017 | Azumi et al. | |
| 2017/0374325 A1 | 12/2017 | Itoh et al. | |
| 2018/0215608 A1 | 8/2018 | Fujishima et al. | |
| 2018/0252578 A1 | 9/2018 | Suzuki et al. | |
| 2018/0267293 A1 | 9/2018 | Fujishima et al. | |
| 2018/0329202 A1* | 11/2018 | Jutzi | G02B 26/0841 |
| 2020/0292389 A1* | 9/2020 | Yonetani | G01N 33/44 |
| 2020/0301137 A1* | 9/2020 | Tanaka | G02B 27/01 |
| 2020/0400940 A1 | 12/2020 | Fujishima et al. | |
| 2020/0403373 A1 | 12/2020 | Yamaguchi et al. | |
| 2021/0109342 A1 | 4/2021 | Fujishima et al. | |

FOREIGN PATENT DOCUMENTS

| | | |
|---|---|---|
| JP | 2003156511 A | 5/2003 |
| JP | 2010197662 A | 9/2010 |
| JP | 2012032481 A | 2/2012 |
| JP | 2012145910 A | 8/2012 |
| JP | 2015148781 A | 8/2015 |
| JP | 2020-101587 | 7/2020 |
| JP | 2020-101588 | 7/2020 |
| WO | WO2011/118296 A1 | 9/2011 |

* cited by examiner

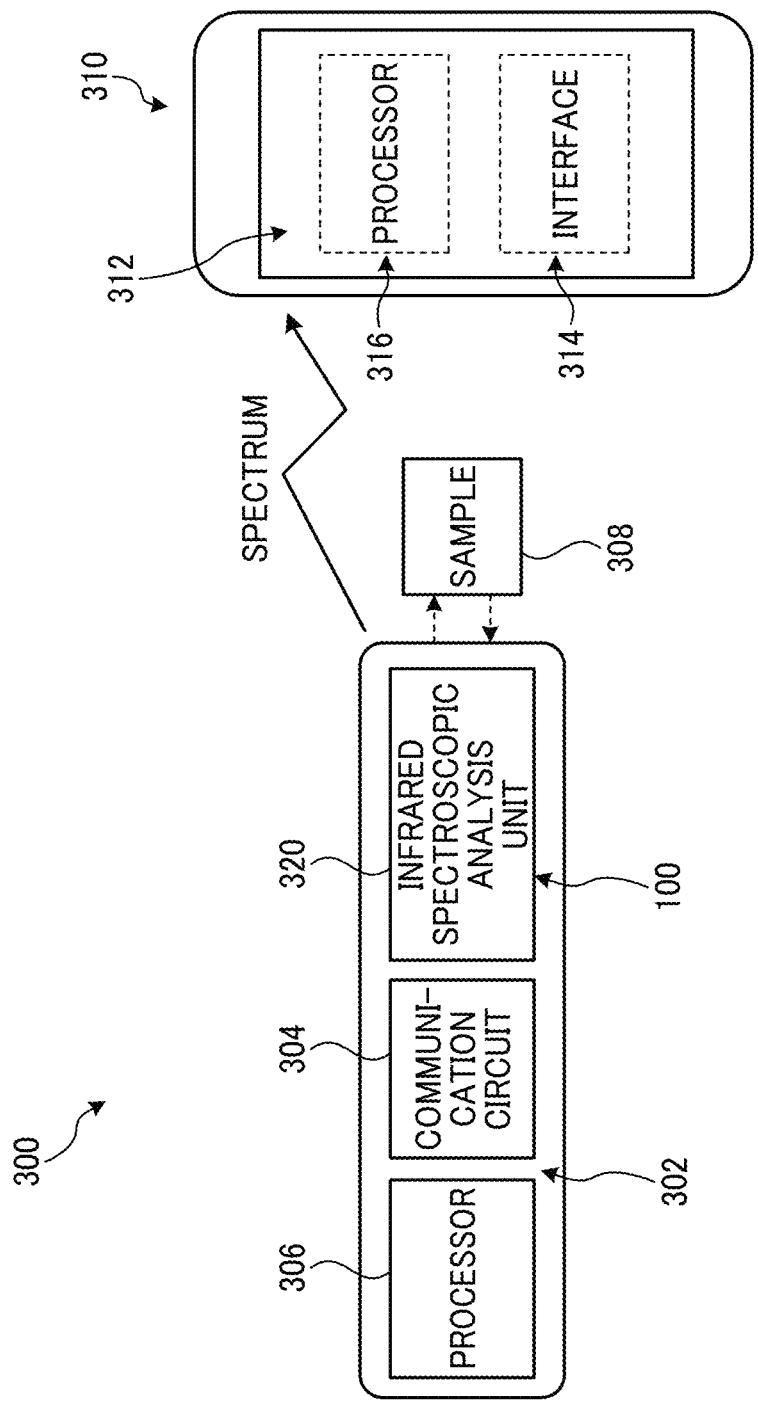

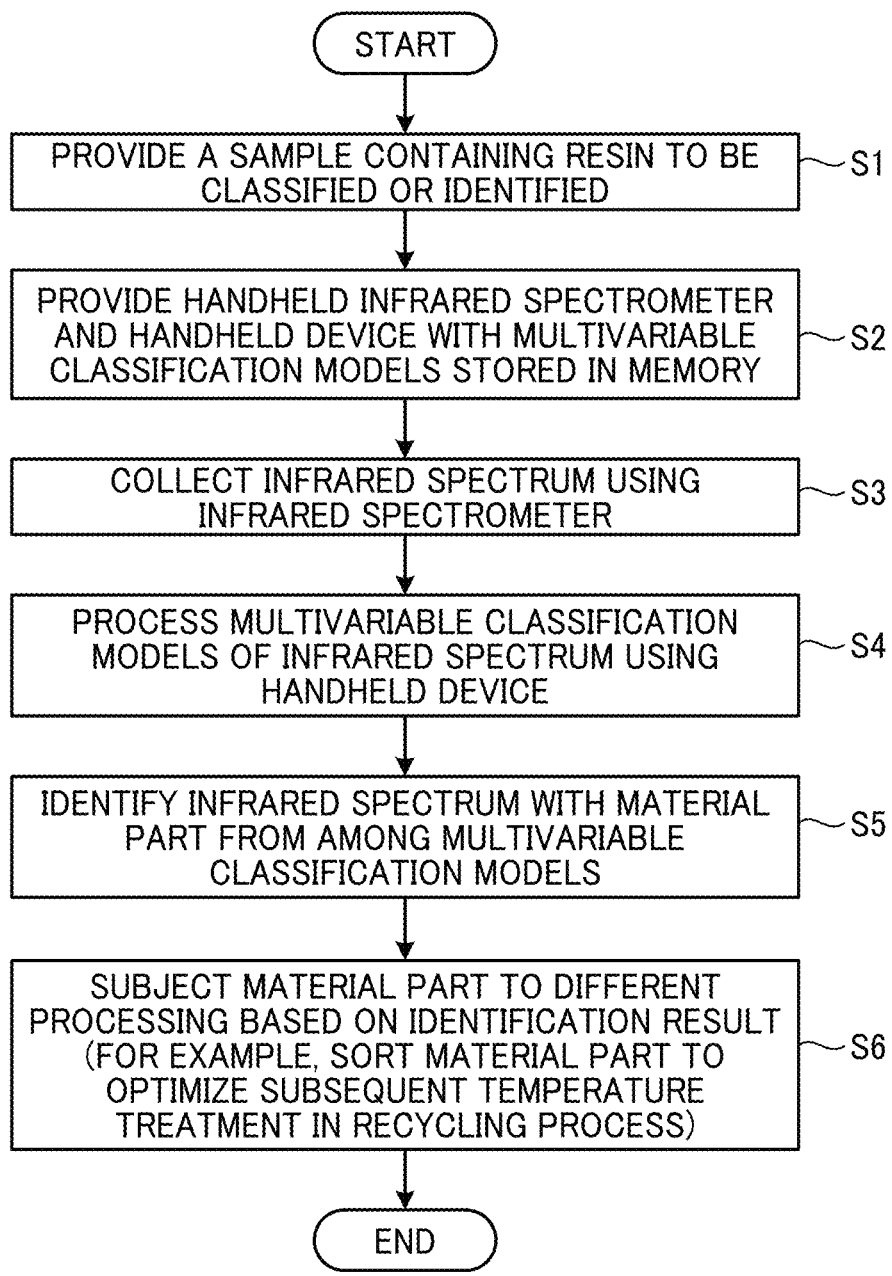

LIGHT DEFLECTOR, ANALYZER, RESIN IDENTIFICATION SYSTEM, AND DISTANCE MEASUREMENT DEVICE

CROSS-REFERENCE TO RELATED APPLICATIONS

This patent application is based on and claims priority pursuant to 35 U.S.C. § 119(a) to Japanese Patent Application No. 2020-182635, filed on Oct. 30, 2020 and Japanese Patent Application No. 2021-144079, filed on Sep. 3, 2021, in the Japan Patent Office, the entire disclosure of which is incorporated by reference herein.

BACKGROUND

Technical Field

The present disclosure relates to a light deflector, an analyzer, a resin identification system, and a distance measurement device.

Related Art

In recent years, with the development of micromachining technology to which semiconductor manufacturing technology is applied, the development of MEMS (Micro Electro Mechanical Systems) devices manufactured by micromachining silicon or glass has advanced.

For example, MEMS devices are known that include a single integrated unit, in which a movable portion having a reflector and elastic beams are integrated on wafer substrates, and drive beams formed by placing piezoelectric material films on the elastic beams. Such MEMS devices causes the movable portion to oscillate using the drive beams.

SUMMARY

A light deflector includes a movable portion including a reflector; multiple drive beams supporting the movable portion to allow the movable portion to be oscillatable; at least one supporting part supporting the multiple drive beams; and a stopper having one end connected to the first connecting portion and the other end connected to the second connecting portion on the at least one supporting part to be contactable with and straddle the multiple drive beams. The at least one supporting part includes a first connecting portion and a second connecting portion different from the first connecting portion

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 19 is an illustration of a system configuration of a spectrometer system according to a sixth embodiment;

FIG. 21 is a flowchart of a resin identifying process according to a seventh embodiment;

Figure 1A:
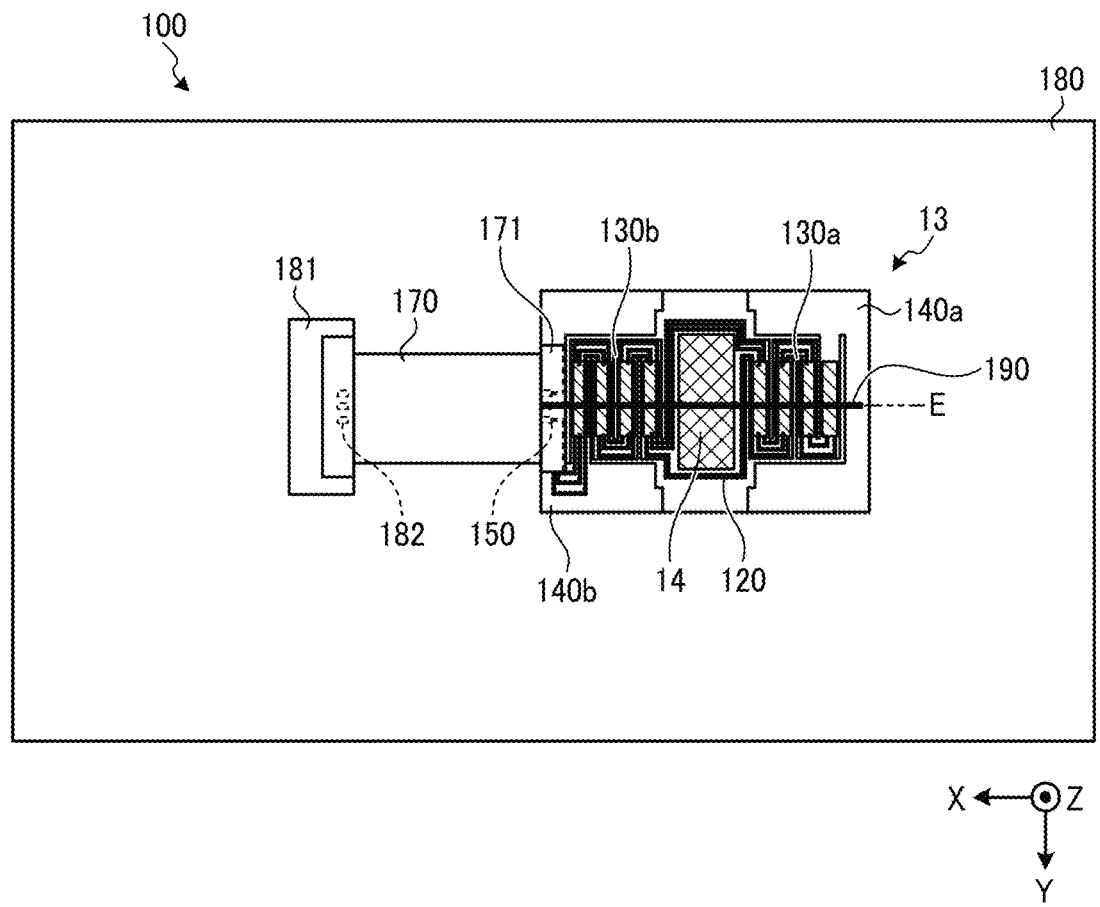
FIGS. 1A and 1B are illustrations of a configuration of a light deflector according to a first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

As used herein, the term "connected/coupled" includes both direct connections and connections in which there are one or more intermediate connecting elements.

Some embodiments provide a more reliable light deflector that is less likely to be damaged.

In the drawings described below, a direction parallel to an oscillation axis of a movable portion of a light deflector is defined as an X-direction, a direction orthogonal to the oscillation axis of the movable portion is defined as a Y-direction, and a direction (i.e., height direction) orthogonal to each of the X-direction and the Y-direction is defined as a Z-direction. The E-axis is the oscillation axis.

First Embodiment

Figure 1B:
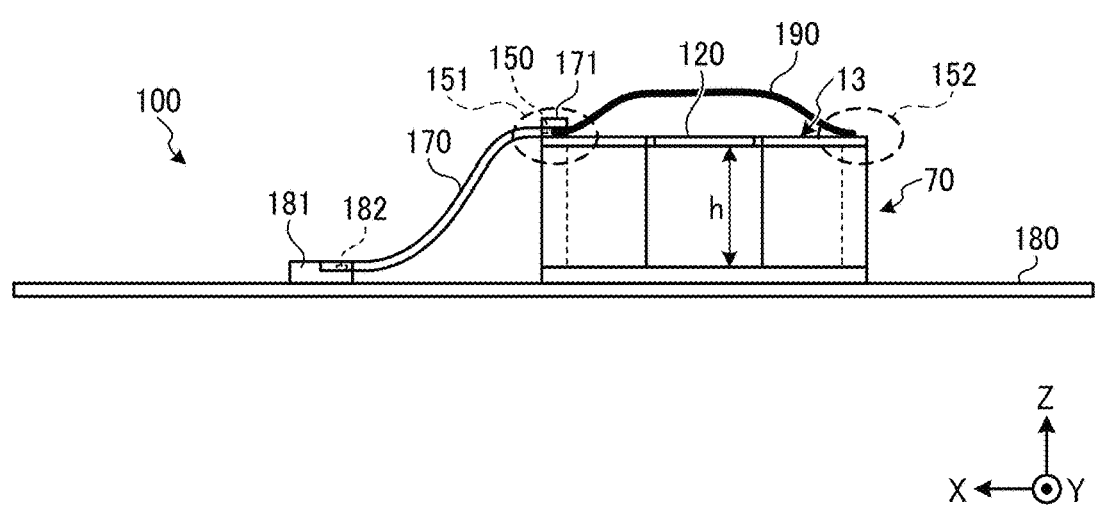

FIGS. 1A and 1B are illustrations of a configuration of a light deflector 100 according to a first embodiment. FIG. 1A is a plan view of the light deflector 100 as viewed from +Z side of the light deflector 100. FIG. 1B is a side view of the light deflector 100 as viewed from the +Y side.

As illustrated in FIG. 1, the light deflector 100 is a micro-electromechanical system (MEMS). The light deflector 100 includes a movable device 13 and a flexible printed circuit (FPC) 170. Further, the light deflector 100 includes an upper restricting portion 190 as a stopper that restricts the amount of deformation of the drive beams 130a and 130b and movement of the reflecting portion 14.

The movable device 13 includes a movable portion 120 with a reflecting portion 14, and a pair of drive beams 130a and 130b supporting the movable portion 120 at both sides of the movable portion 120 to allow the movable portion 120 to oscillate around the E axis. The movable device 13 further includes a pair of supporting parts 140a and 140b supporting the pair of drive beams 130a and 130b, and a mount portion 70 on which which the pair of supporting parts 140a and 140b are stationary. The reflecting portion 14 is planar on the +Z side of the movable portion 120, and is an example of a reflector that reflects incident light.

The circuit board 180 is an example of a drive unit to drive the movable device 13. The circuit board 180 includes a drive device (drive circuit) that drives the movable device 13, and a control device (control circuit) that controls the drive device.

The FPC 170 is a flexible wiring board that maintains its electrical characteristics when deformed. The FPC 170 is an example of an input wiring board that enables application of voltage to the movable device 13 from the circuit board 180.

In addition, electrode connecting portion 150 (150a, 150b, and 150c) is provided on the +Z surface of the supporting part 140b in the movable device 13. The electrode connecting portion 150 is an example of a voltage input part through which voltage is input from the FPC 170 to the piezoelectric actuators on the drive beams 130a and 130b. In addition, the electrode connecting portion 150 is electrically connected to a wiring-side electrode portion at one side of the FPC 170 via a device-side connector 171.

Another wiring-side electrode portion at another side of the FPC 170 is electrically connected to a circuit-side electrode portion 182 on the circuit board 180 via a board-side connector 181. The movable device 13 causes the movable portion 120 to oscillate around the E-axis using a drive voltage applied from the circuit board 180 through the FPC 170, to enable light reflected by the reflecting portion 14 to be deflected in a direction orthogonal to the E-axis, thus achieves scanning with light in the direction orthogonal to the E-axis.

Notably, an oscillation angle of the movable portion 120 is to be increased to increase the scanning angle of the light reflected by the reflecting portion 14. However, if the oscillation angle of the movable portion 120 is increased (i.e., the movable portion 120 significantly oscillates) with a short distance between the movable portion 120 and the circuit board 180 in the Z-direction, the movable portion 120 might collides with the circuit board 180 downstream of the movable portion 120 in the −Z-direction. This might restrict the oscillation angle of the movable portion 120.

To avoid such a situation, in at least one embodiment, the mount portion 70 is disposed between the movable portion 120 and the circuit board 180 to increase a distance h between the movable portion 120 and the circuit board 180 in the Z-direction. This configuration prevents the movable portion 120 from colliding with the circuit board 180 even with an increase in the oscillation angle of the movable portion 120.

Further, if the electrode connecting portion 150 of the movable device 13 and the circuit-side electrode portion 182 of the circuit board 180 are connected to each other by wire bonding with a long distance h between the movable portion 120 and the circuit board 180 in the Z direction, wires for such wire bonding might be easily cut off, or the junction of the electrodes might easily come off. This might reduce the stability of the mechanical bonding and electrical connection.

In embodiments of the present disclosure, the movable device 13 is connected to the circuit board 180 via the FPC 170, and the electrode connecting portion 150 of the movable device 13 is connected to the wiring-side electrode portion of the FPC 170 through an anisotropic conductive resin film. This configuration enables a stable connection of the movable device 13 and the circuit board 180.

Next, the configuration of the movable device 13 will be described with reference to FIGS. 2A and 2B.

Figure 2A:
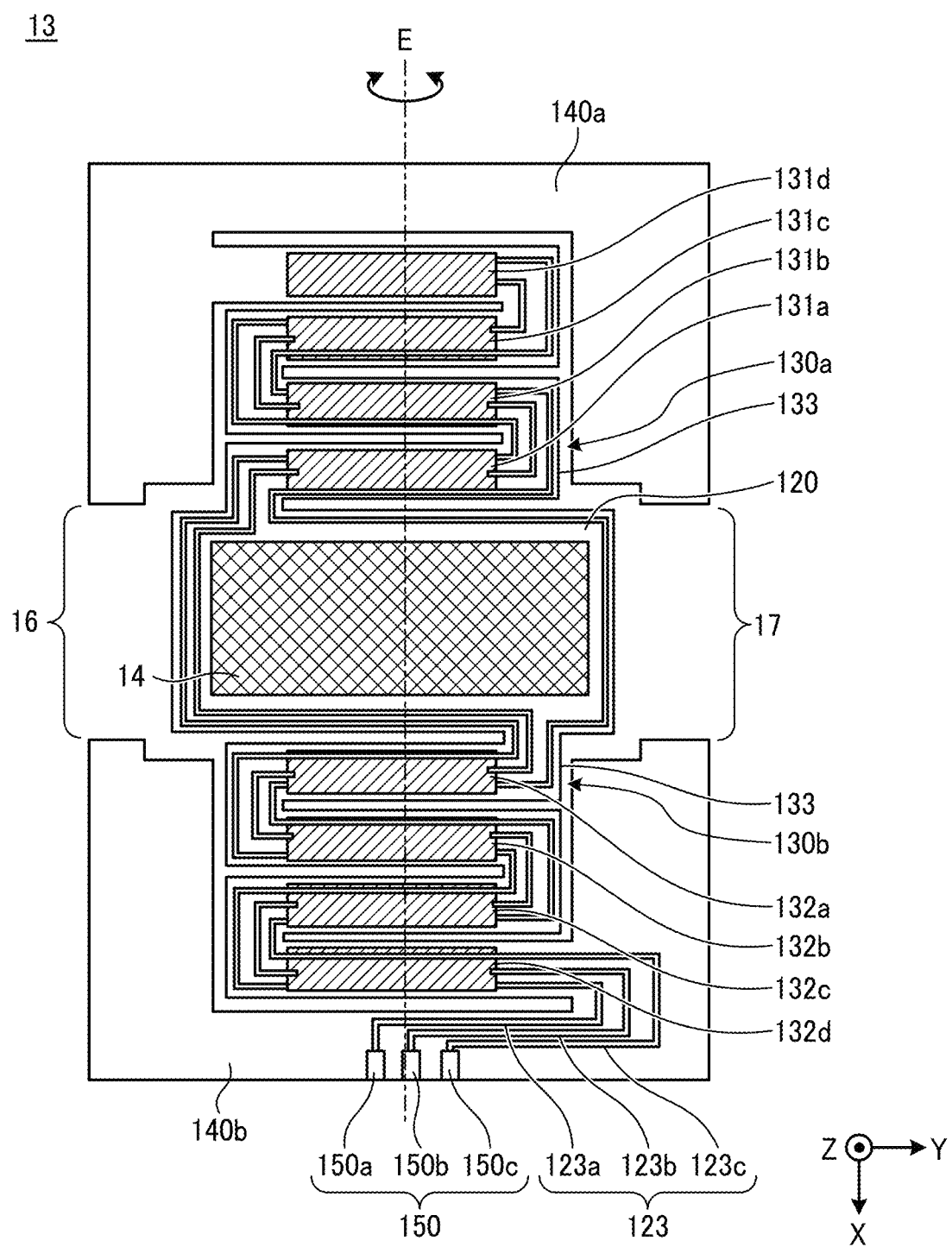
FIG. 2A is a plan view of an exemplary configuration of a movable device of the light deflector in FIGS. 1A and 1B, according to an embodiment.

FIG. 2A is a plan view of a configuration of the movable device 13 with a both-side-support beam structure that uniaxially deflects light. As illustrated in FIG. 2A, the movable device 13 includes a reflecting portion 14 that reflects incident light, a movable portion 120 on which the reflecting portion 14 is formed, drive beams 130a and 130b, and supporting parts 140a and 140b. FIG. 2A illustrates the reflecting portion 14 as an example of a rectangular reflecting portion; however, it is not limited thereto, and the shape of a reflecting surface may be another shape, such as a circle or an ellipsoid.

The drive beams 130a and 130b are an example of a pair of drive beams supporting the movable portion 120 at both sides of the movable portion 120 to enable the movable portion 120 to oscillate around the E-axis parallel to the X-axis. The drive beams 130a and 130b causes the movable portion 120 to oscillate so as to change the tilt of the reflecting portion 14 on the movable portion 120. The supporting parts 140a and 140b are an example of a pair of supporting part supporting the pair of drive beams 130a and 130b. The supporting part 140a supports the drive beam 130a, and the supporting part 140b supports the drive beam 130b.

The drive beam 130a is an example of a meandering beam having a meander structure (i.e., a turning structure) including multiple beam members 133. The drive beam 130a has one end coupled to an outer edge portion of the movable portion 120, and has the other end coupled to an inner edge portion of the supporting part 140a. Each of the multiple beam members 133 included in the drive beam 130a is formed with piezoelectric actuators 131a to 131d. Each of the piezoelectric actuators 131a to 131d is an example of an actuator and can deform the drive beam 130a.

The drive beam 130b is an example of a meandering beam having a meander structure (i.e., a turning structure) including multiple beam members 133. The drive beam 130b has one end coupled to an outer edge portion of the movable portion 120, and has the other end coupled to an inner edge portion of the supporting part 140b. Each of the multiple beam members 133 included in the drive beam 130b is formed with piezoelectric actuators 132a to 132d. Each of the piezoelectric actuators 132a to 132d is an example of an actuator, and can deform the drive beam 130b.

The location where the drive beam 130a is connected to the movable portion 120 and the location where the drive beam 130b is connected to the movable portion 120 are arranged point-symmetrically with respect to the center of the reflecting portion 14. Further, the location where the drive beam 130a is connected to the supporting part 140a and the location where the drive beam 130b is connected to the supporting part 140b are arranged point-symmetrically with respect to the center of the reflecting portion 14. In some examples, these locations are arranged ling-symmetrically with respect to the line (i.e., line parallel to the Y-axis) orthogonal to the E-axis on a plane parallel to the reflecting portion 14.

The supporting part 140b has an electrode connecting portion 150, to which voltage from the circuit board 180 (see FIGS. 1A and 1B) is input, on the +Z surface. The electrode connecting portion 150 includes a positive electrode connecting portion 150a to which a positive voltage is input, a GND connecting portion 150b connected to the GND, and a negative electrode connecting portion 150c to which a negative voltage is input. The positive electrode connecting portion 150a, the GND connecting portion 150b, and the negative electrode connecting portion 150c are examples of multiple voltage input parts (i.e., an input part) arranged in a direction (i.e., the Y-direction) intersecting the E-axis. The direction in which the positive electrode connecting portion 150a, the GND connecting portion 150b, and the negative electrode connecting portion 150c are arranged is along the longitudinal direction (i.e., the Y-direction) of each of the multiple beam members 133 constituting the drive beam 130a or the drive beam 130b.

Wiring 123 including at least one wire is provided in a region other than the reflecting portion 14 on the +Z surface of the movable portion 120 and on a +Z surface of each of the drive beams 130a and 130b. In a case where the wiring 123 includes multiple wires are provided in the region other than the reflecting portion 14 on +Z surface of the movable portion 120, the reflecting portion 14 is surrounded by the multiple wires (the wiring 123). Such an arrangement prevents the weight deviation. The piezoelectric actuators 131a to 131a provided on the drive beam 130a are electrically connected to the electrode connecting portion 150 provided on the supporting part 140b by the wiring 123 passing on the surface of the movable portion 120. A voltage input to the electrode connecting portion 150 is transmitted through the wiring 123 to each of the piezoelectric actuators 132a to 132d and also to each of the piezoelectric actuators 131a to 131d through the surface of the movable portion 120. The drive voltage input through the electrode connecting portion 150 is applied to both of the drive beams 130a and 130b through the wiring 123.

The wires 123 include a positive voltage conducting wire 123a through which a positive voltage signal is transmitted, a GND conducting wire 123b connected to the GND, and a negative voltage conducting wire 123c through which a negative voltage signal is transmitted. The positive voltage conducting wire 123a is connected to the positive electrode connecting portion 150a. The GND conducting wire 123b is connected to the GND connecting portion 150b. The negative voltage conducting wire 123c is connected to the negative electrode connecting portion 150c.

Between the supporting part 140a and the supporting part 140b, an opening area where the supporting part 140 (the supporting parts 140a and 140b) does not exist is provided at each side of the movable portion 120 along the Y-direction. Such an opening area defines light passing areas 16 and 17. The light passing areas 16 and 17 enables light reflected by the reflecting portion 14 to be transmitted therethrough when the movable portion 120 oscillates. The light passing areas 16 and 17 may be an air gap where any element does not exit, or may include a member that transmits light, such as glass, at at least a part of such an air gap. In one example, the light passing areas 16 and 17 each has a tapered shape in which the width parallel with the E-axis increases with an increase in the distance from the E-axis.

Figure 2B:
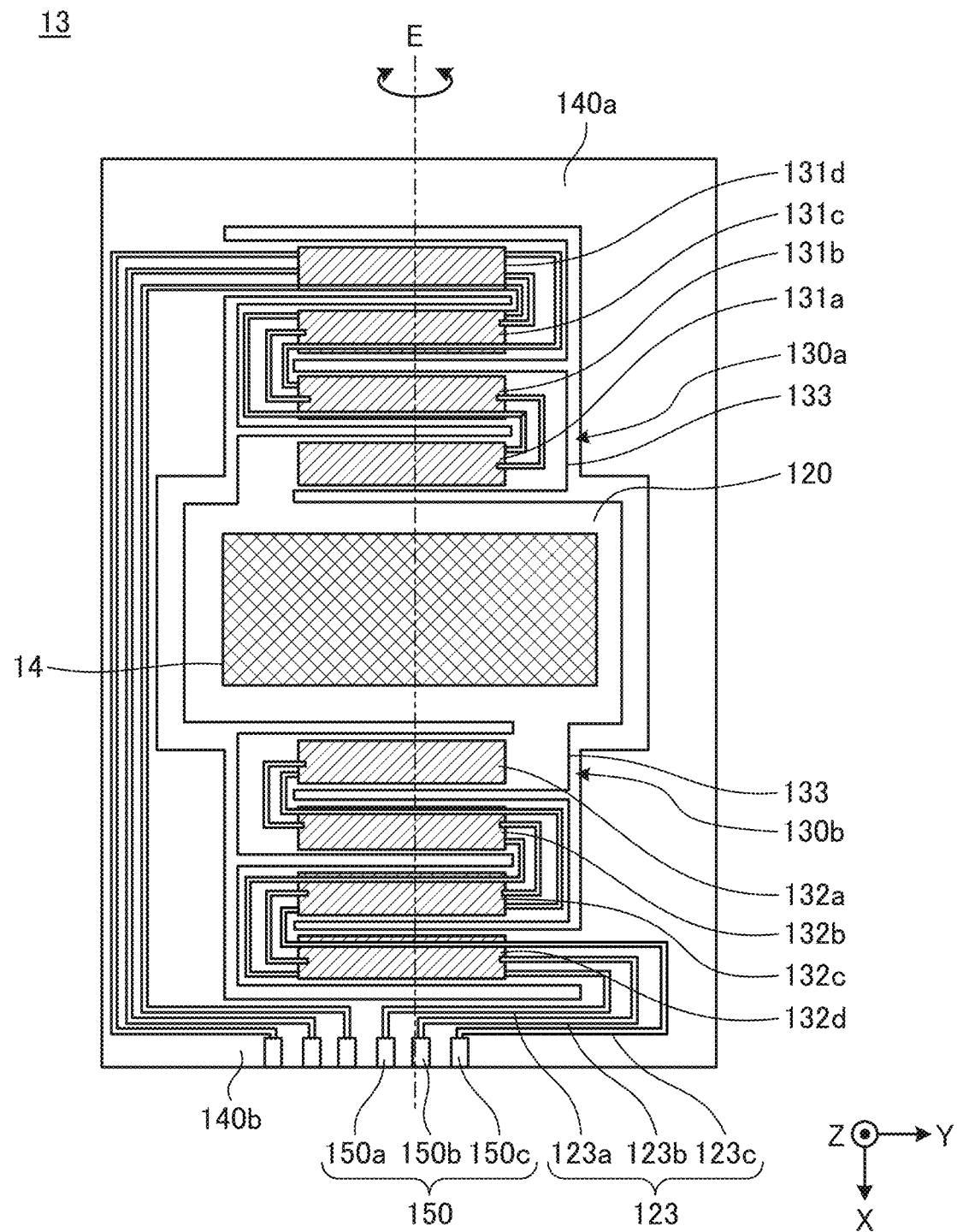
FIG. 2B is a plan view of another exemplary configuration of the movable device.

FIG. 2B is an illustration of another exemplary configuration of the movable device 13 in which the supporting part 140a and the supporting part 140b are formed as a single integrated unit of a frame-like shape surrounding the movable portion 120. These supporting parts are formed in a frame-like shape as long as light deflected by the rotatably oscillating reflecting portion 14 does not hit the supporting part and also as long as even such light hitting the supporting part does not cause any adverse effect on the movable device 13. Forming the supporting part in a frame-like shape facilitates an operation after dividing a semiconductor wafer into individual pieces, and also facilitates the operation of bonding the supporting part to the mount portion 70.

In addition, such a frame-like supporting part allows an arrangement of a wire, and allows voltage supply from the electrode pad 150 to the piezoelectric actuators 131a to 131d without the arrangement of wire around the reflecting portion 14.

The movable device 13 includes, one silicon on insulator (SOI) substrate that is formed by any appropriate treatment method, such as etching. On the formed SOI substrate, the reflecting portion 14, the drive beam 130, and the electrode connecting portion 150 are formed, which constitutes a single integrated unit of the above-described components. The above-described multiple components may be formed after the SOI substrate is molded, or may be formed while the SOI substrate is being molded.

Figure 6:
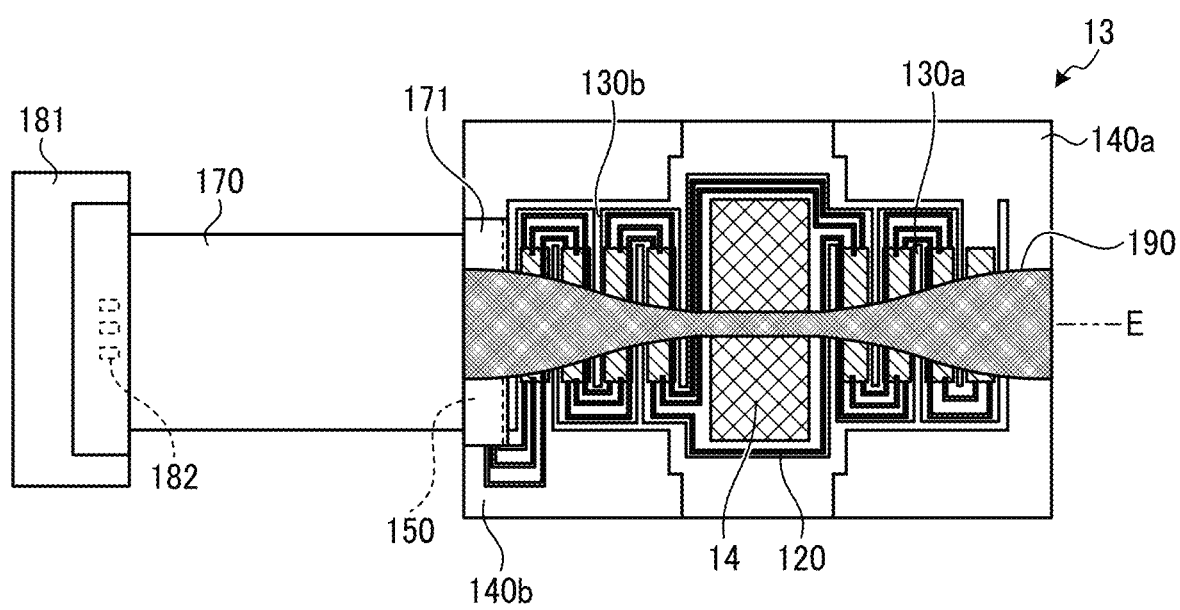
FIG. 6 is an illustration of a configuration of a light deflector according to a variation of the first embodiment.

The following describes a configuration of a mount portion 70 with reference to FIG. 6.

Figure 3A:
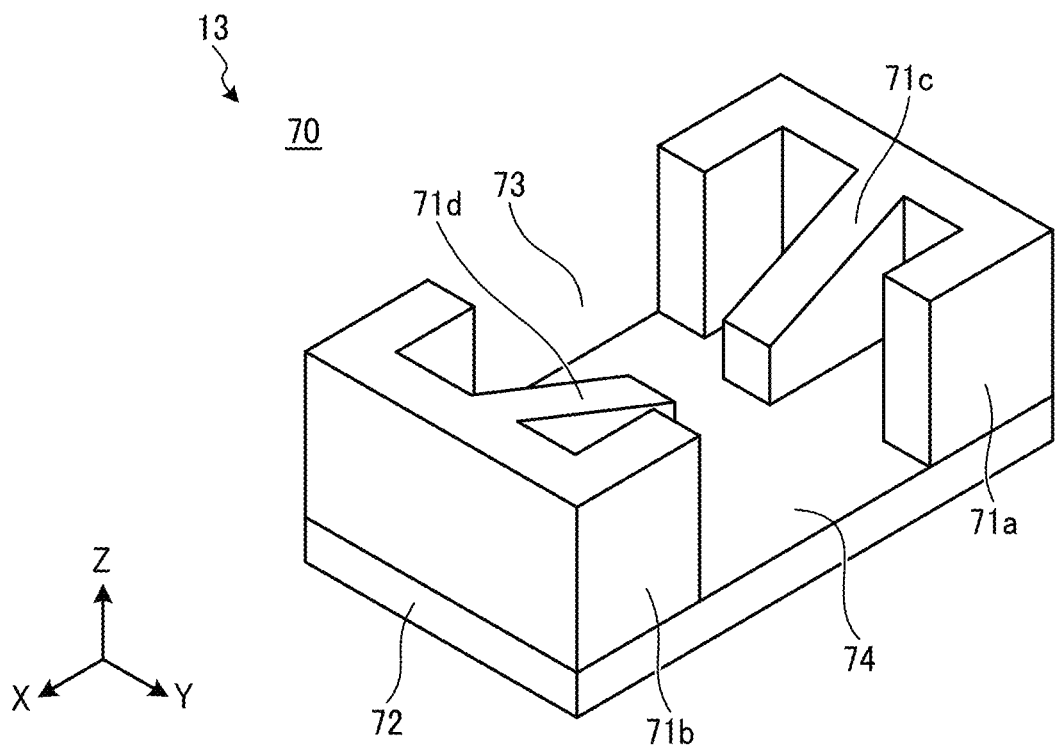
FIG. 3A is a perspective view of an exemplary configuration of a mount portion on which the movable device is mounted.

FIG. 3A is a perspective view of the mount portion 70 according to an embodiment of the present disclosure. As illustrated in FIG. 3A, the mount portion 70 includes side wall members 71a and 71b, and a bottom member 72. The mount portion 70 has light passing portions 73 and 74 through which light reflected by the reflecting portion 14 passes.

The side wall member 71a is a member having an angular C-shaped section that is orthogonal to the Z-axis. The side wall member 71a is secured by bonding or the like to the +Z surface of the bottom member 72 that is a plate-shaped member such that the open side of the angular C-shape faces in the +X-direction. Similarly, the side wall member 71b is a member having an angular C-shaped section that is orthogonal to the Z-axis. The side wall member 71b is secured by bonding or the like to the +Z surface of the bottom member 72 such that the open side of the angular C-shape faces in the −X-direction.

The mount portion 70 includes lower restricting portions 71c and 71d, or lower stoppers downstream of the movable device 13 in the −Z-direction (i.e., below the movable device 13), which are formed of the same material as the side wall members 71a and 71b. As illustrated in FIG. 3A, the lower restricting portions 71c and 71d are connected to portions of the side wall members 71a and 71b and extends, below the drive beams 130a and 130b, in a direction parallel to the oscillation axis-E (i.e., the X-direction) of the movable device 13. The lower restricting portions 71c and 71d do not exist below the reflecting portion 14 to prevent the movable device 13 from contacting the lower restricting portions 71c and 71d during a rotatable oscillation of the movable device 13. The drive beams 130a and 130b of the movable device 13 has a turning structure, or a meandering structure, which integrates the amount of deformation of the drive beams 130a and 130b to oscillate the reflecting portion 14. Accordingly, the amount of deformation of the drive beams 130a and 130b in the Z-direction increases from the supporting part 140 toward the reflecting portion 14. In this arrangement, the lower restricting portions 71c and 71d have sloping surfaces to have the height decreasing from the supporting part 140 to the reflecting portion 14 along the oscillation axis of the movable portion, so as to prevent the drive beams 130a and 130b of the movable device 13 from contacting the lower restricting portions 71c and 71d.

Figure 3B:
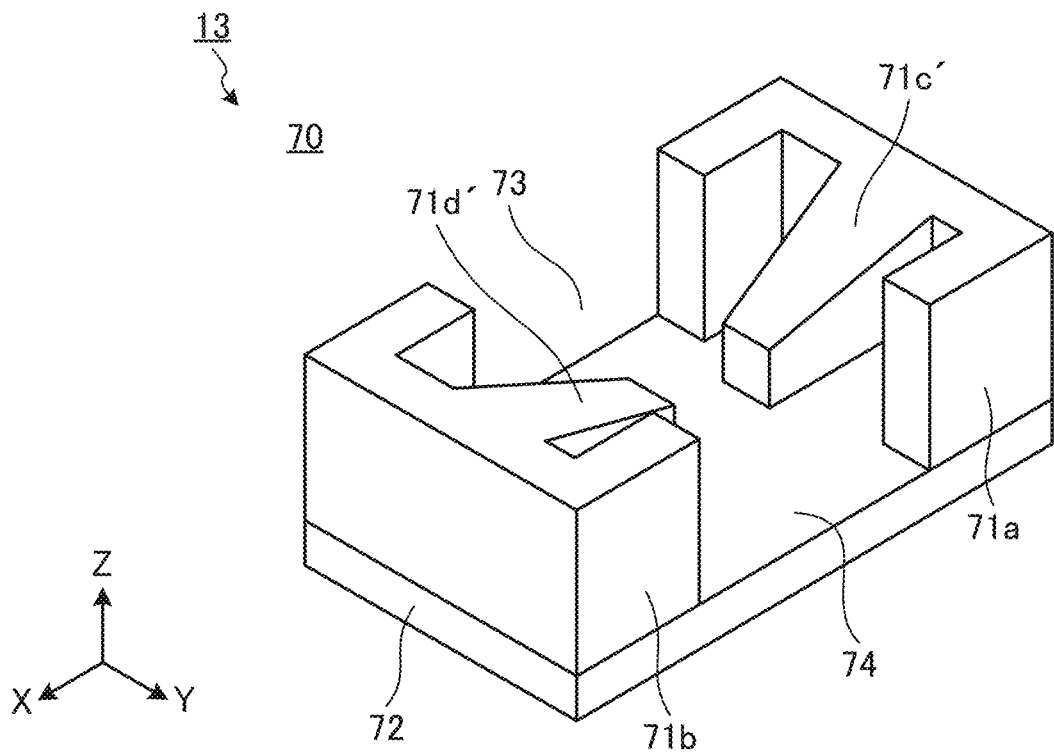
FIG. 3B is a perspective view of another exemplary configuration of the mount portion.

The lower restricting portions 71c' and 71d' in FIG. 3B have side faces, to which the side wall members 71a and 71b are respectively connected, having Z-directional and Y-directional lengths longer than the other side faces closer to the reflecting portion 14.

Figure 3C:
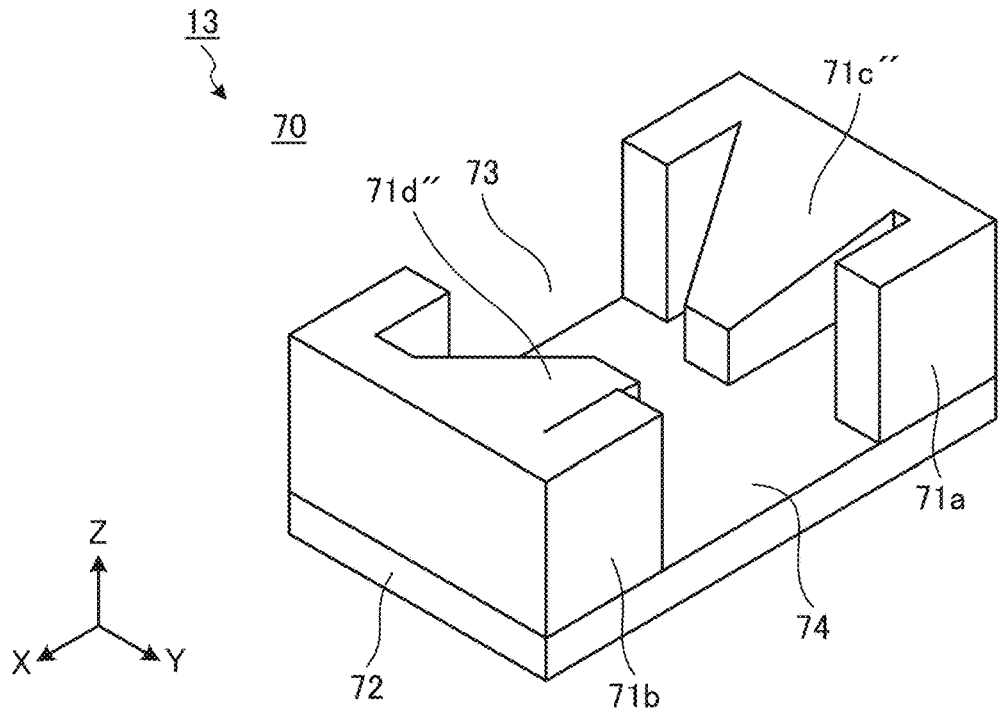
FIG. 3C is a perspective view of still another exemplary configuration of the mount portion.

Further, the lower restricting portions 71c'' and 71d'' in FIG. 3C have side faces, to which the side wall members 71a and 71b are respectively connected, arranged asymmetrically about the axis of rotation of the reflecting portion 14 in the Y-direction.

The lower restricting portions 71c'' and 71d'' in FIG. 3C are arranged for the positions at which the drive beams 130a and 130b are connected to the supporting parts 140a and 140b as illustrated in FIG. 2-1, respectively. Further, in each of the lower restricting portions 71c'' and 71d'' in FIG. 3C, the side face connected to a corresponding one of the side wall members 71a and 71b extends to the corner of the corresponding one of the side wall members 71a and 71b in the Y-direction.

In some examples, the side wall members 71a and 71b, and the bottom member 72 are formed as a single integrated unit. When a metal-based material is used, such a member can be fabricated by, for example, casting, cutting, or metal injection molding. When a resin-based material is used, such a member can be fabricated by, for example, injection molding or using a 3D printer. The supporting parts 140a and 140b are secured to the +Z surfaces of the side wall members 71a and 71b.

The light passing portions 73 and 74 are space formed by arranging the side wall member 71a and the side wall member 71b apart from each other in the X-direction. The light passing portion 73 is formed on the −Y side of the mount portion 70, and the light passing portion 74 is formed on the +Y side of the mount portion 70.

Each of the light passing portions 73 and 74 is an air gap where any element does not exit, or includes a member that transmits light, such as glass, at at least a part of such an air gap. In some examples, the light passing portions 73 and 74 each has a tapered shape in which the width along the X axis increases with an increase in the distance from the X axis.

Figure 4A:
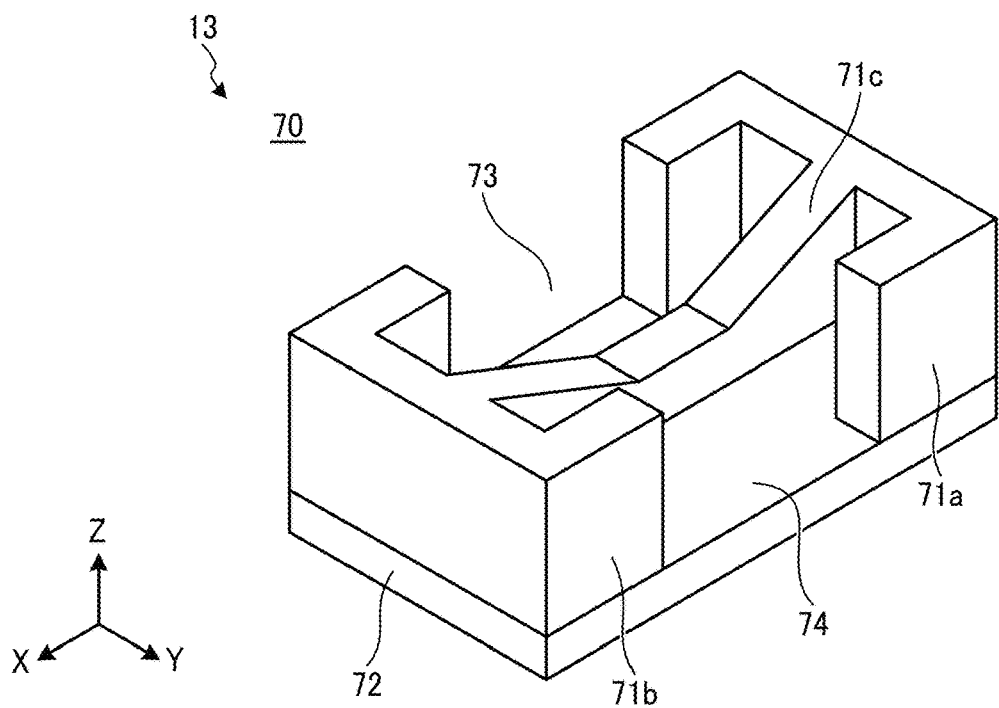
FIG. 4A is a perspective view of yet another exemplary configuration of the mount portion.

FIG. 4 is a perspective view of the mount portion 70 according to an embodiment of the present disclosure. As illustrated in FIG. 4, the side wall members 71a and 71b, and the lower restricting portion 71c are formed as a single integrated unit. As illustrated in FIG. 4, the lower restricting portion 71c has a sloping surface to have the height in the Z-direction decreasing from the supporting part 140 of the movable device 13 to the reflecting portion 14 along the oscillation axis of the movable portion (i.e., the height of the lower restricting portion 71c in the Z-direction is shortest below the reflecting portion 14 of the movable device 13), so as to prevent a rotatably-oscillating reflecting portion 14 of the movable device 13 from contacting the lower restricting portion 71c.

With the movable device 13 oscillating or at standstill, the lower restricting portions 71c and 71d do not contact the movable device 13. Further, even when the drive beams 130a and 130b of the movable device 13 is extended or stretched by an additional acceleration produced by dropping of the light deflector 100 or any impact on the light deflector 100, the lower restricting portions 71c and 71d prevent the reflecting portion 14 of the drive beams 130a and 130b from deforming significantly beyond the limits within which the reflecting portion 14, or the movable device 13 remains undamaged, thus preventing the reflecting portion 14, or the movable device 13 from being damaged.

Further, the lower restricting portions 71c and 71d with sloping surfaces having a height decreasing from the supporting part 140 to the reflecting portion 14 along the rotation axis of the movable portion reduces the duration of contact of the drive beams 130a and 130b or the reflecting portion 14 with the lower restricting portions 71c and 71d, during which the drive beams 130a and 130b are locally extended or stretched. In other words, such a reduction in duration of contact of the drive beams 130a and 130b or the reflecting portion 14 with the lower restricting portions 71c and 71d reduces the degree of a local stretch or extension of the drive beams 130a and 130b and avoids a local concentration of stress in the movable device 13, thus preventing a certain part of the movable device 13 from easily breaking down.

Figure 4B:
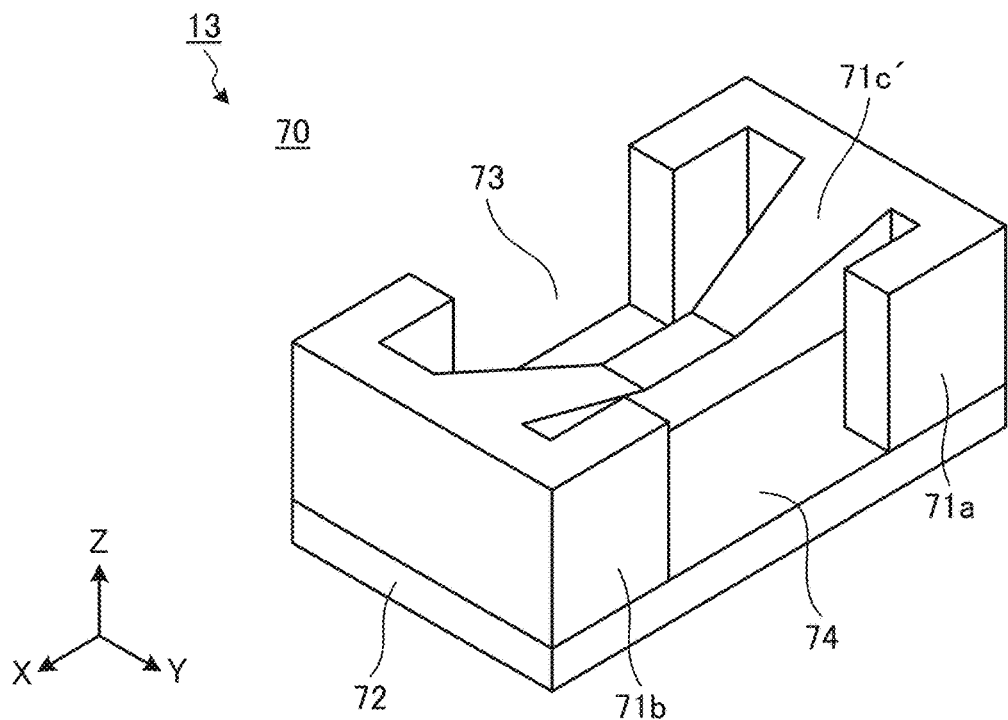
FIG. 4B is a perspective view of further another exemplary configuration of the mount portion.

Further, the lower restricting portions 71c' and 71d' in FIG. 3B and the lower restricting portion 71c' in FIG. 4B each have a side face, which is connected to a corresponding one of the side wall member 71a and 71b, larger than the other side face closer to the reflecting portion 14. This configuration more significantly reduces the duration of contact of the drive beams 130a and 130b or the reflecting portion 14 with the lower restricting portions 71c' and 71d', during which the drive beams 130a and 130b are locally extended or stretched. In other words, such a reduction in duration of contact of the drive beams 130a and 130b or the reflecting portion 14 with the lower restricting portions 71c and 71d reduces the degree of a local stretch or extension of the drive beams 130a and 130b and avoids a local concentration of stress on the movable device 13, thus preventing a certain part of the movable device 13 from easily breaking down.

Figure 4C:
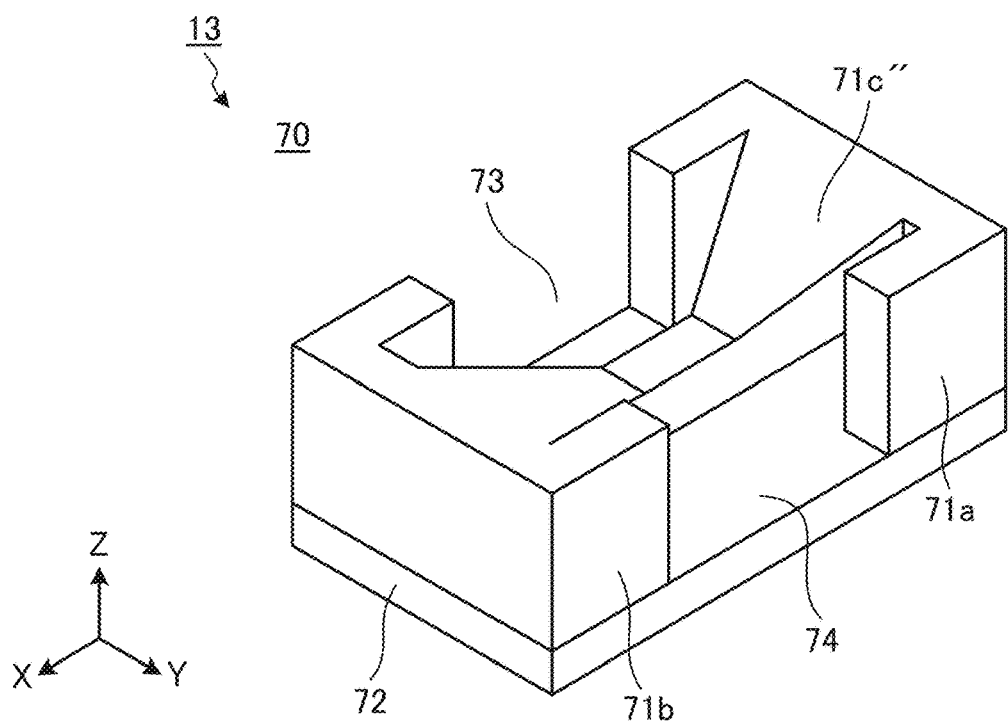
FIG. 4C is a perspective view of still further another exemplary configuration of the mount portion.

In the movable device 13 in FIG. 2A, more stress is likely to concentrate on the areas in which the drive beams 130a and 130b are connected to the supporting parts 140a and 140b, respectively, causing such areas or portions of the movable device 13 to easily break down. To deal with such an issue, the lower restricting portions 71c" and 71d" in FIGS. 3C and 4C are arranged near the drive beams 130a and 130b in such areas. This arrangement prevents the drive beams 130a and 130b from damaging that portions between the drive beams 130a and 130b and the supporting parts 140a and 140b.

In the configuration in FIG. 4, the movement of the reflecting portion 14, or a mirror surface, in the −Z-direction due to an additional acceleration produced by the impact on the movable device 13 is smaller than the configuration in FIG. 3A. Further, the reflecting portion 14, or the mirror surface in FIG. 4 does not collide with the mount portion 70 regardless of such additional acceleration. Thus, the configuration in FIG. 4 prevents damage, particularly to the mirror surface and the connection of the mirror surface (the reflecting portion 14) and the drive beams 130a and 130b.

Next, a configuration of the FPC 170 is described with reference to FIG. 5.

Figure 5:
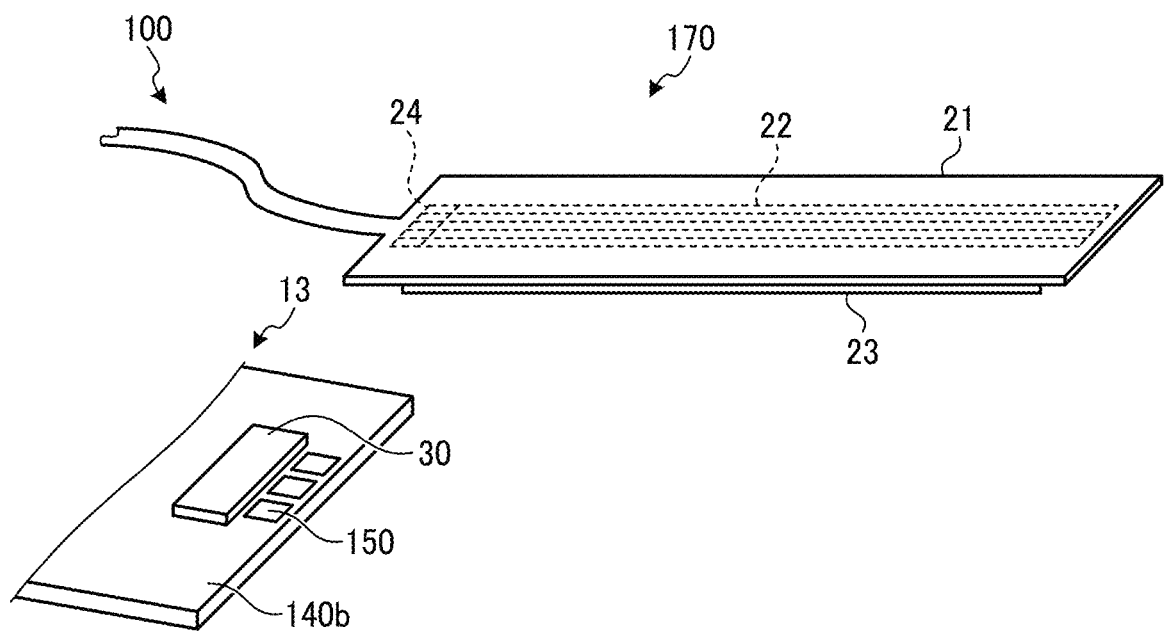
FIG. 5 is an exploded perspective view of a connecting portion of the movable device and a flexible printed circuit, according to an embodiment.

FIG. 5 is an exploded perspective view of a connecting portion of the movable device 13 and the FPC 170, according to an embodiment.

As illustrated in FIG. 5, the light deflector 100 includes a movable device 13, a FPC 170, and an anisotropic conductive film (ACF) 30. The movable device 13 and the FPC 170 are coupled to each other with the ACF 30 as an example of an anisotropic conductive resin film between the movable device 13 and the FPC 170.

The anisotropic conductive resin film is designed to have multiple conductive particles dispersed inside thermosetting or ultraviolet curable resin. The anisotropic conductive resin film has electric anisotropy that exhibits conductivity in the thickness direction of the press-fixed portion and an insulating property in the planar direction when the anisotropic conductive resin film is fixed with heat and pressure. Such an anisotropy facilitates both mechanical connection and electric connection. The anisotropic conductive resin film has two types: an ACF and a an anisotropic conductive paste (ACP).

The supporting part 140b of the movable device 13 is provided with the electrode connecting portion 150 (a land portion) for electrically connecting the movable device 13 to the FPC 170. The FPC 170 includes a base film 21, multiple conductor wires 22 on the back of the base film 21, and a cover film 23 covering the conductor wires 22. The conductor wires 22 has one end uncovered with the cover film 23 and serving as wiring-side electrode portion 24 connected with the electrode connecting portion 150 of the movable device 13.

The ACF 30 has a size sufficient to cover the entire electrode connecting portion 150 and all of the terminal portions of the FPC 170. This provides a long-term stable conductivity. Further, the ACF 30 having a length equal to or longer than the width of the FPC 170 increase the joint strength.

The electrode connecting portion 150 and the wiring-side electrode portion 24 are opposed to each other, and both electrode portions are fixed together with heat and pressure, with the ACF 30 between the electrodes. This enables electrical connection between the movable device 13 and the FPC 170. The FPC 170 has the other end connected to the electrode of the circuit board 180.

In the present embodiment, the ACF 30, which is a film, is used to connect the movable device 13 to the FPC 170. In some examples, an ACP, which is a paste, is used to connect the movable device 13 to the FPC 170. Using the ACF and the ACP each having electric anisotropy can reduce the distance between the electrodes of the movable device 13, up to, for example, approximately 20 μm. Such a reduction in the distance between the electrodes can reduce the size of each of the movable device 13 and the FPC 170, thus enabling downsizing of the light deflector 100.

The following describes an upper restricting portion 190 on the light deflector 100.

As illustrated in FIGS. 1A and 1B, the upper restricting portion 190 is an elongated part of the FPC 170. The upper restricting portion 190 has one end bonded to an electrode, a first connecting portion, on the supporting part 140a of the movable device 13 with an anisotropic conductive film (ACF), and the other end bonded to another electrode, a second connecting portion, on the supporting part 140b of the movable device 13 with an ACF. The upper restricting portion 190 is arranged on and along the oscillation axis of the movable portion 120 of the movable device 13. In addition, the upper restricting portion 190 is curved outward to be convex upward (i.e., in the +Z-direction) in which the reflecting portion 14 reflects light, so as not to contact the driving beams 130a and 130b and the reflecting portion 14 during the rotatably oscillation of the movable device 13.

The supporting part 140 in FIG. 2B is in the form of a frame, in which the supporting part 140a and the supporting part 140b are formed as a single integrated unit.

The upper restricting portion 190, which is a stretched part of the FPC 170, is joined to the movable device 13 through the process of joining the FPC 170 to the electrode connecting portion 150 of the supporting part 140b. However, the upper restricting portion 190 may not be such an elongated part of the FPC 170 and may be separate from the FPC 170.

With an additional significant acceleration due to a strong impact on the light deflector 100, the drive beams 130a and 130b likely deform more significantly, and the reflecting portion 14 of the movable device 13 likely rotatably oscillates with a larger amplitude.

The upper restricting portion 190 restricts the amount of deformation of the drive beams 130a and 130b and the amount of movement of the reflecting portion 14 in the +Z-direction, and maintains the amount of deformation of the drive beams 130a and 130b within the limits in which the movable device 13 remains undamaged. The upper restricting portion 190 improves the impact resistance of the light deflector 100 in the +Z-direction by preventing damage particularly to the mirror surface (i.e., the reflecting portion 14), the drive beams 130a and 130b, and the connecting portions between the reflecting portion 14 and the drive beams 130a and 130b.

In addition, the upper restricting portion 190 made of flexible material is restored to maintain its shape when the reflecting portion 14 of the movable device 13 hits the upper restricting portion 190 in reaction to the impact.

In the configuration according to an embodiment as described above, the upper restricting portion 190 arranged along the oscillation axis of the movable portion 120 of the light deflector 100 restricts the amount of movement of the movable portion 120 and the amount of deformation of the drive beams 130a and 130b of the light deflector 100 in the +Z-direction within the limits in which the movable portion 120 and the drive beams 130a and 130b remain undamaged. This prevents the movable portion 120 and the pair of drive beams 130a and 130b from protruding beyond the upper restricting portion 190, thus increasing the impact resistance of the light deflector 100 in the +Z-direction. Thus, damage to the light deflector 100 is reduced or prevented.

Variation

FIG. 6 is a diagram showing a modification of the overall configuration of the light deflector 100 according to the first embodiment. The upper restricting portion 190 in FIG. 6 is shaped to have a portion with a minimum width above the reflecting portion 14 in the XY plan view. In other words, the upper restricting portion 190 is shaped to have a minimum width that lies over the reflecting portion 14. Further, the upper restricting portion 190 as a stopper is shaped to have a maximum width at the connecting portions.

Such an upper restricting portion 190 having a portion with a minimum width that lies over the reflecting portion 14 enables a smaller area that blocks the optical path of light from the light deflector 100. Further, the maximum width at the connecting portions maintains the adhesive strength.

This configuration prevents the upper restricting portion 190 from coming off at the electrode connecting portion 150 when the reflecting portion 14 hits the upper restricting portion 190 in reaction to the impact on the light deflector 100, or the movable device 13, and increases the impact resistance of the movable device 13.

In at least one embodiment, the movable device 13 includes a pair of drive beams 130a and 130b, a movable portion 120 between the drive beams 130a and 130b, the reflecting portion 14 on the movable portion 120, and the upper restricting portion 190 that restricts the movement of the drive beams 130a and 130b to prevent the drive beams 130a and 130b from protruding beyond the upper restricting portion 190. However, the number of drive beams is not limited to two. The same configuration applies to, for example, a vector-scanning light deflector in which three or more drive beams are arranged around the movable portion 120 having the reflecting portion 14, facing in three or more directions.

Second Embodiment

Next, a second embodiment is described.

In the first embodiment, the upper restricting portion is a part of the flexible printed circuit (FPC). In the second embodiment, the upper restricting portion is provided through wire bonding. In the following description of the second embodiment, the description of the same portions as those of the first embodiment is omitted, and differences from the first embodiment are described.

Figure 7:
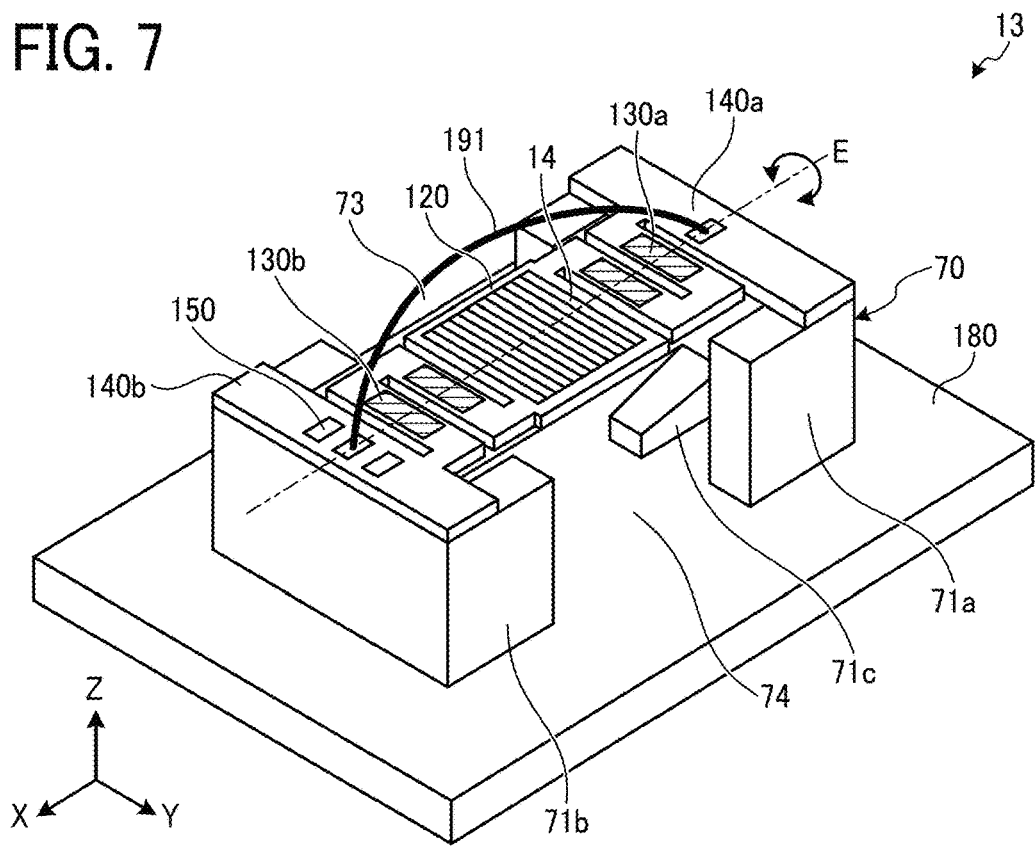
FIG. 7 is a perspective view of a configuration of a light deflector according to a second embodiment.

FIG. 7 is a perspective view of an overall configuration of a light deflector 100 according to a second embodiment. As illustrated in FIG. 7, the light deflector 100 includes an upper restricting portion 191 that serves as a stopper. The upper restricting portion 191 is bonded to the electrode connecting portion 150 on the supporting parts 140a and 140b of the movable device 13 through ball bonding, or wire bonding. The upper restricting portion 191 is made of metal, such as gold or aluminum. The upper restricting portion 191 is curved outward to be convex upward (i.e., in the +Z-direction) in which the reflecting portion 14 reflects light, so as not to contact the reflecting portion 14 during the oscillation of the movable portion 120 having the reflecting portion 14.

Further, such a conductive upper restricting portion 191 according to at least one embodiment provides the electrical connection between the supporting part 140a and the supporting part 140b of the movable device 13.

Specifically, the upper restricting portion 191 is set as a ground wire (GND). In the conventional arrangement, ground wires (GND) or signal lines are arranged around the perimeter of the reflecting portion 14 for the supporting parts 140a and 140b of any shape other than the frame-shape as illustrated in FIG. 1. However, the upper restricting portion 191 as a ground wire (GND), according to at least one embodiment, reduces the number of wires around the reflecting portion 14.

In the configuration in which the upper restricting portion 190 is formed as a part of the FPC as described in the first embodiment above, the upper restricting portion 190 is electrically connected to the electrode connecting portion 150 through ACF bonding to allow electrical connection between the supporting part 140a and the supporting part 140b of the movable device 13. The upper restricting portion 190 as a part of the FPC allows electrical connection between the supporting part 140a and the supporting part 140b of the movable device 13 using multiple wires, which can be used as signal lines or ground wires (GND).

The conductivity of the upper restricting portion 191, which enables the electrical connection between the supporting part 140a and the supporting part 140b of the movable device 13, may be used to form a circuit. Such a circuit detects detachment of the upper restricting portion 191 from the supporting part 140a and the supporting part 140b or detects disconnection of the upper restricting portion 191. The detection of the circuit enables the movable device 13 to continue operating properly while notifying a user of the abnormality irrespective of the occurrence of detachment of the upper restricting portion 191 having, for example, a damage-prevention capability from the supporting part 140a and the supporting part 140b or the disconnection of the upper restricting portion 191.

As described above, the upper restricting portion 191 bonded to the electrode connecting portion 150 through ball bonding, or wire bonding is more easily formed to be loop-shaped so as to avoid contact with the drive beams 130a and 130b and the reflecting portion 14 during the proper operation of the movable device 13.

Variation

Figure 8:
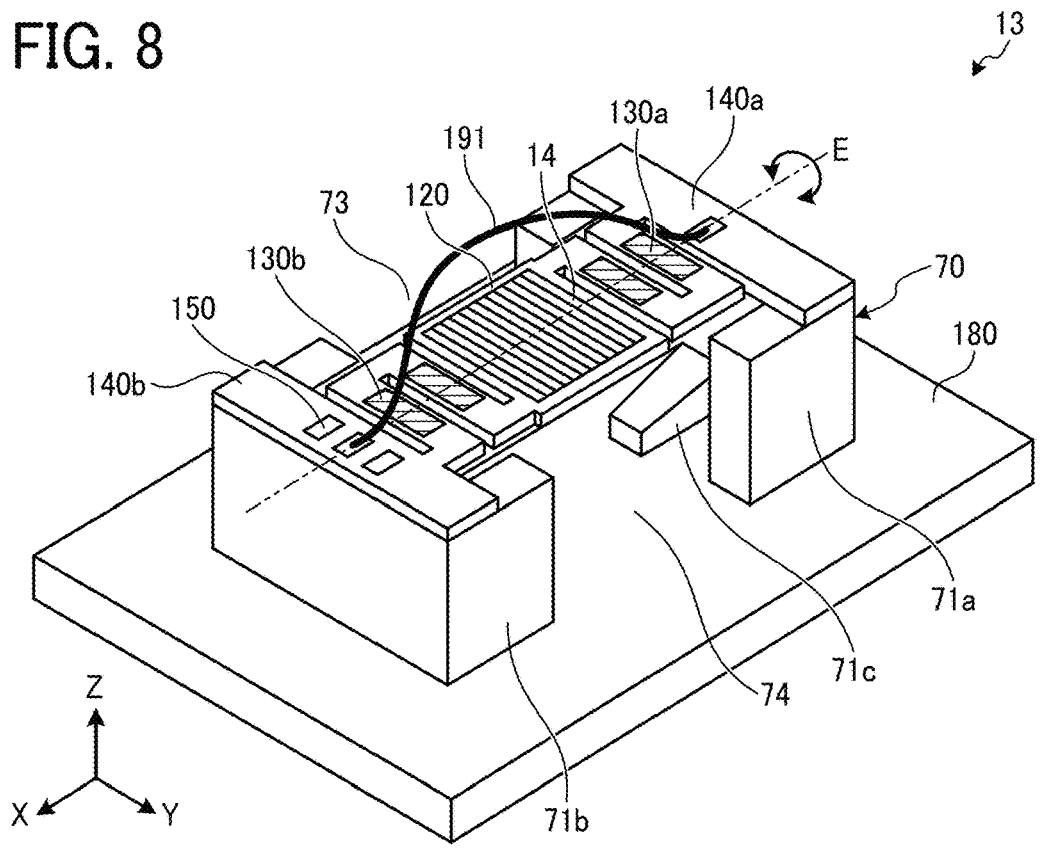
FIG. 8 is an illustration of a configuration of a light deflector according to a variation of the second embodiment.

FIG. 8 is an illustration of an overall configuration of a light deflector 100 according to a variation of the second embodiment. As illustrated in FIG. 8, wedge bonding may be employed as wire bonding. The configuration using wedge bonding as illustrated in FIG. 8 enables a lower rising angle of the upper restricting portion 191 from the electrode connecting portion 150 (i.e., a lower angle at which the upper restricting portion 191 rises from the electrode connecting portion 150) than the ball bonding does.

In view of the relation between the wire boding (i.e., the wedge bonding and the ball bonding) and the rising angle, the designer appropriately selects the ball bonding or the wedge bonding to be applied for bonding the upper restricting portion 191 through wire bonding according to the amplitude of the oscillation of the reflecting portion 14 of the movable device 13. Selecting the ball bonding or the wedge bonding according to the amplitude of the oscillation of the reflecting portion 14 determines the height of the loop of the upper restricting portion 191, which prevents the reflecting portion 14 from contacting the upper restricting portion 191.

Third Embodiment

Next, a third embodiment is described below.

In the second embodiment, the upper restricting portion is one wire provided through wire bonding. In the third embodiment, the upper restricting portion provided is formed by multiple wires provided through wire bonding. In the following description of the third embodiment, the description of the same portions as those of the first embodiment and the second embodiment is omitted, and differences from the first embodiment and the second embodiment are described.

Figure 9:
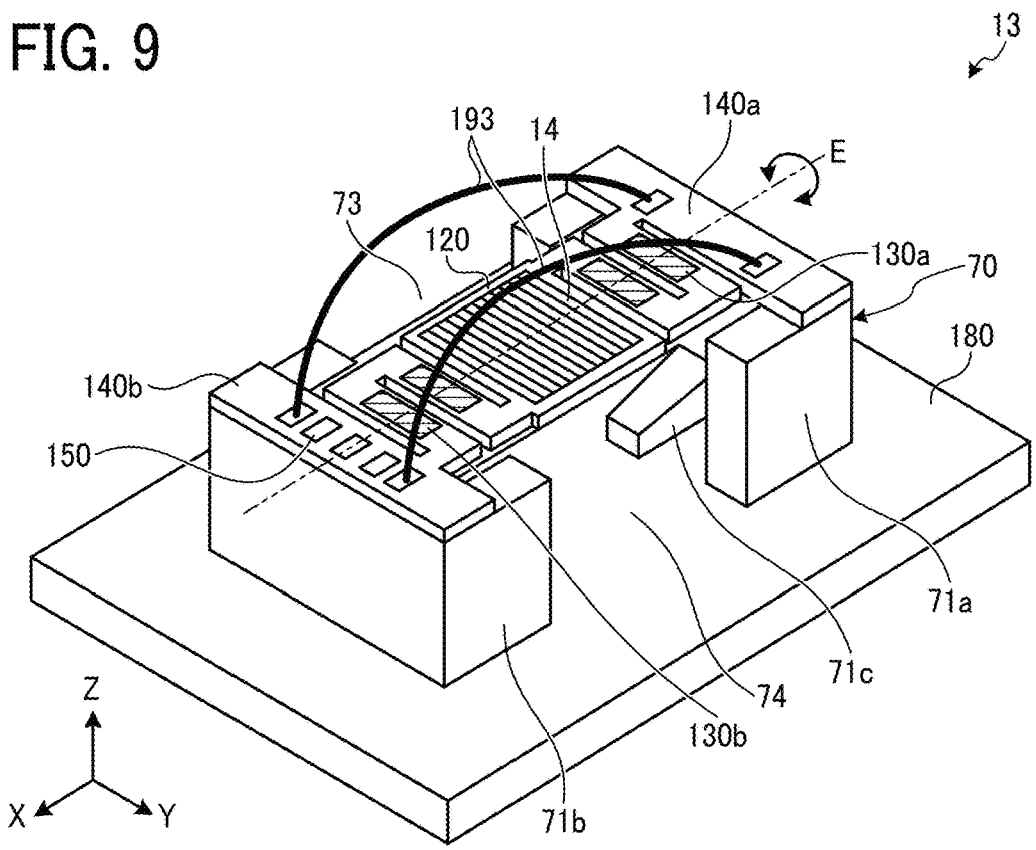
FIG. 9 is a perspective view of a configuration of a light deflector according to a third embodiment.

FIG. 9 is a perspective view of an overall configuration of a light deflector 100 according to a third embodiment. As illustrated in FIG. 9, the light deflector 100 includes upper restricting portions 193 that serve as a stopper. In FIG. 9, two upper restricting portions 193 are used. The upper restricting portions 193 are bonded by ball bonding of wire bonding to electrode connecting portions 150, which are arranged in the direction orthogonal to the oscillation axis of the movable device 13 of the light deflector 100, on the supporting parts 140a and 140b. The upper restricting portions 193 are arranged in parallel to the oscillation axis of the movable device 13 of the light deflector 100. In the present embodiment, two upper restricting portions 193 are disposed so as to be line-symmetric with respect to the oscillation axis of the reflecting portion 14. The upper restricting portions 193 are partly over the reflecting portion 14 in the plan view.

Such multiple upper restricting portions 193 according to the present embodiment prevents the drive beams 130a and 130b and the reflecting portion 14 of the movable device 13 from protruding more reliably when impact is applied on the movable device 13.

In the present embodiment, two upper restricting portions 193 are provided, but no limitation is indicated thereby. In some other examples, two or more upper restricting portions may be used.

Variation

Figure 10:
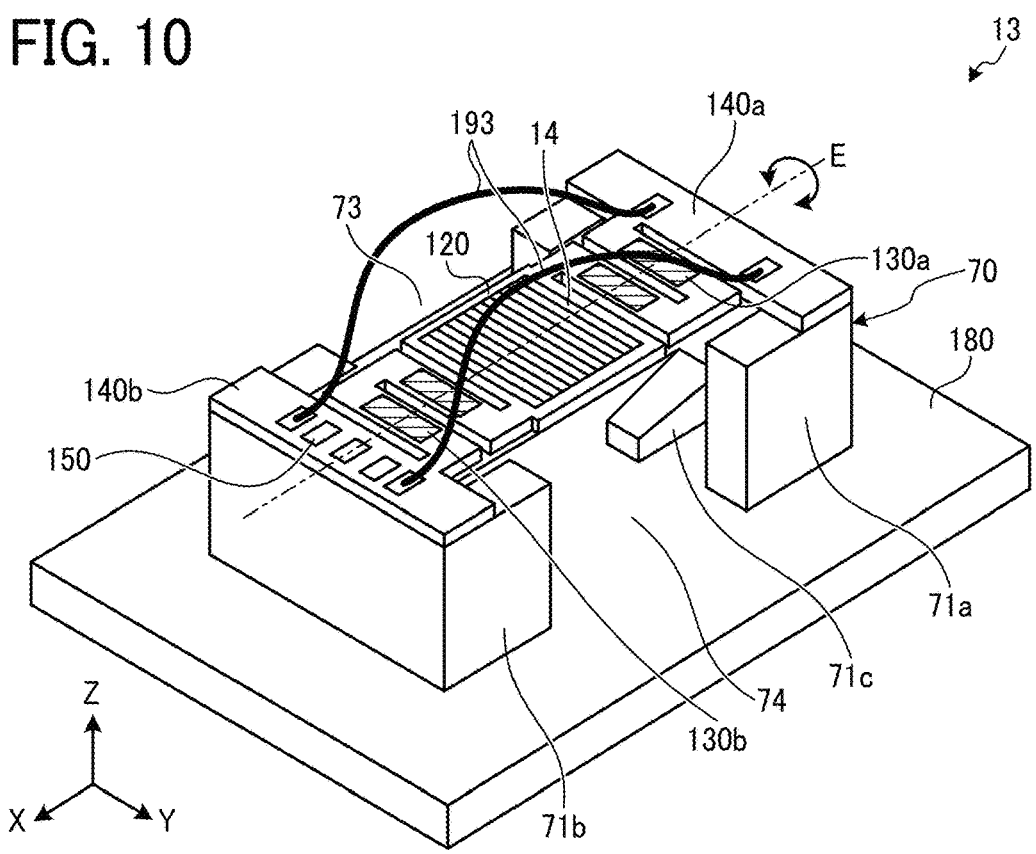
FIG. 10 is a perspective view of a configuration of a light deflector according to a variation of the third embodiment.

FIG. 10 is an illustration of an overall configuration of a light deflector 100 according to a variation of the third embodiment. As illustrated in FIG. 10, wedge bonding may be employed as wire bonding. Such multiple upper restricting portions 193 provided by wedge bonding in FIG. 10 prevents the drive beams 130a and 130b and the reflecting portion 14 of the movable device 13 from protruding more reliably when impact is applied on the movable device 13.

Fourth Embodiment

Next, the fourth embodiment is described.

The fourth embodiment is the same as the third embodiment in that multiple upper restricting portions are provided by wire bonding, and differs from the third embodiment in the positions at which the upper restricting portions are arranged. In the following description of the fourth embodiment, the description of the same portions as those of the first embodiment to the third embodiment is omitted, and differences from the first embodiment to the third embodiment are described.

Figure 11A:
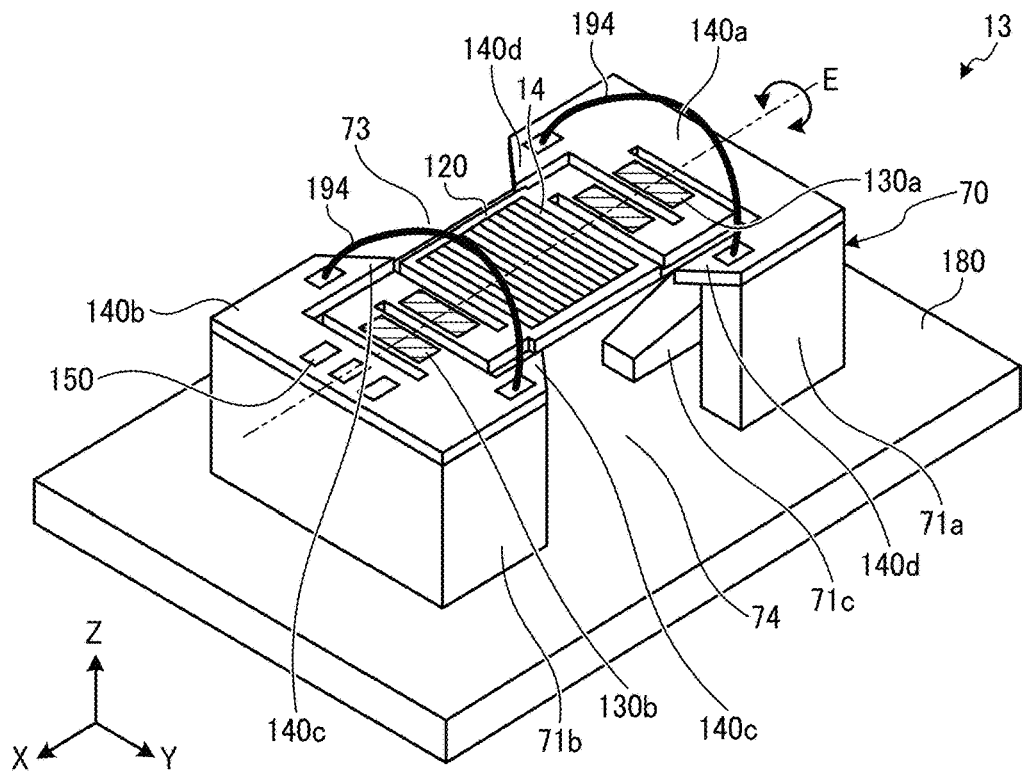
FIG. 11A is a perspective view of a configuration of a light deflector according to a fourth embodiment.
Figure 11B:
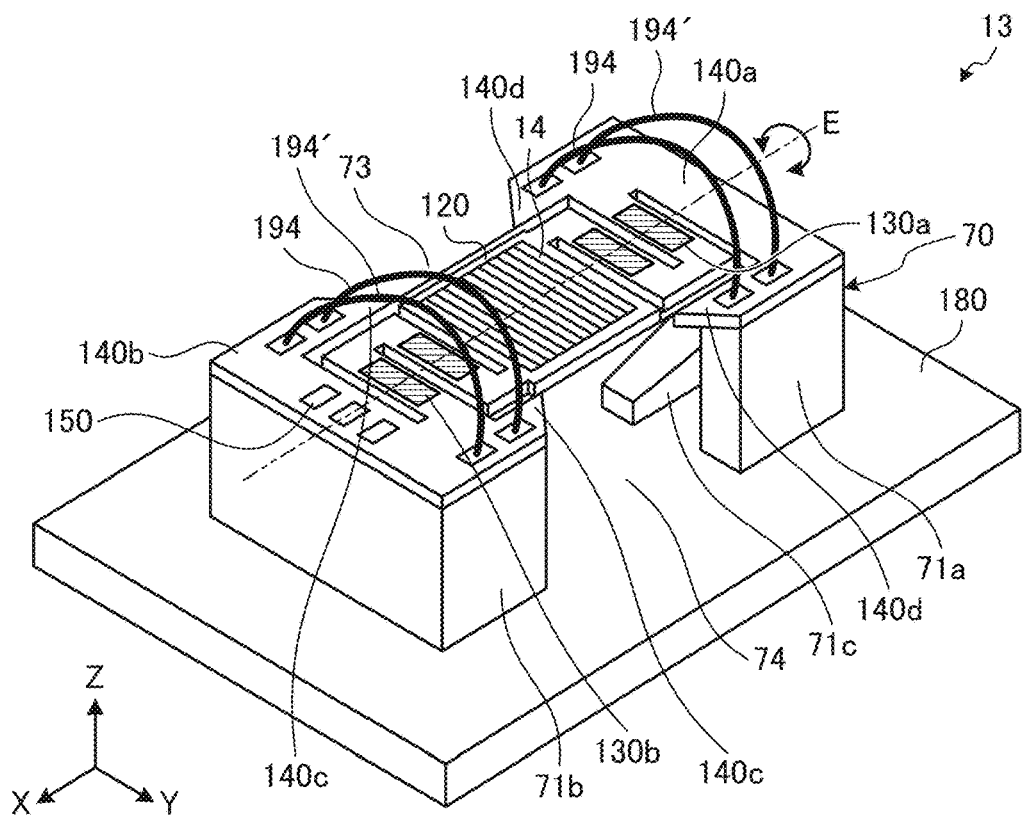
FIG. 11B is a perspective view of a configuration of a light deflector according to a variation of the fourth embodiment.
Figure 12:
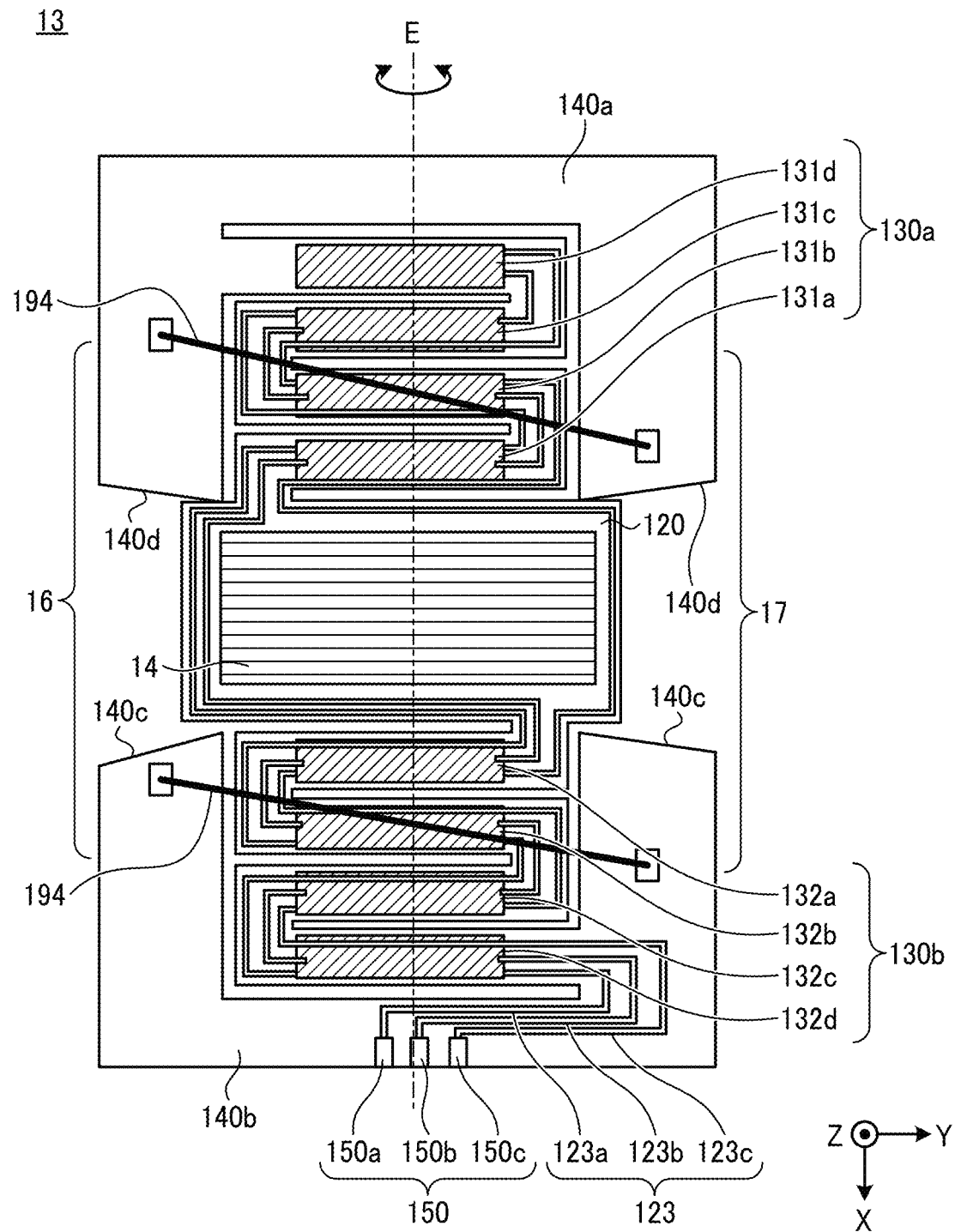
FIG. 12 is a plan view of a movable device according to an embodiment.

FIG. 11A is a perspective view of a configuration of a light deflector according to the fourth embodiment. FIG. 11B is a perspective view of a configuration of a light deflector according to a variation of the fourth embodiment. FIG. 12 is a plan view of a configuration of the movable device 13 according to an embodiment. As illustrated in FIGS. 11B and 12, the light deflector 100 includes upper restricting portions 194 that serve as a stopper.

As illustrated in FIG. 11A, a mount portion 70 includes side wall members 71a and 71b, and also has light passing portions 73 and 74 through which light reflected by the reflecting portion 14 passes. The supporting parts 140a and 140b of the movable device 13 have extending portions 140c and 140d arranged in the X-axis direction. The extending portions 140c and 140d extending in the X-axis direction are arranged in parallel to the oscillation axis about which the reflecting portion 14 of the movable device 13 rotatably oscillates. In other words, the extending portions 140c and 140d extending in the X-axis direction are arranged in the direction vertical to the direction in which the electrode connecting portions 150 connected to the FPC 170 are arranged. The extending portions 140c and 140d are shaped to fit the side wall members 71a and 71b of the mount portion 70. The extending portions 140c and 140d extending in the X-axis direction do not cover the light passing portions 73 and 74 to let the light reflected by the reflecting portion 14 pass through.

As illustrated in FIG. 11A, the upper restricting portions 194 are bonded by ball bonding of wire bonding to electrode connecting portions 150 on the extending portions 140c and 140d extending in parallel to the oscillation axis of the movable device 13 of the light deflector 100. The upper restricting portions 194 are arranged in parallel to the oscillation axis of the movable device 13 of the light deflector 100. The upper restricting portion 194 is arranged in the direction orthogonal to the oscillation axis of the movable device 13 of the light deflector 100.

The drive beams 130a and 130b of the movable device 13 have a turning structure (i.e., a meander structure). The upper restricting portion 194 is disposed so as to straddle the drive beams 130a and 130b. More specifically, the upper restricting portions 194 lies over the turning portions of the meander structure in the +Z direction. In the present embodiment, the upper restricting portions 194 each are arranged on the straight line connecting the midpoint of a first turning portion closest to the reflecting portion 14 and the midpoint of a second turning portion that is second closest to the reflecting portion 14.

Further, the upper restricting portions 194 are each arranged to be line symmetric with respect to the line vertical to the oscillation axis of the reflecting portion 14 and passing through the center of the reflecting portion 14. The upper restricting portions 194 are arranged to straddle the drive beams 130a and 130b of the movable device 13, but not to cross over the reflecting portion 14. The upper restricting portions 194 are curved outward to be convex upward (i.e., in the +Z direction) in which the reflecting portion 14 reflects light, so as not to contact the drive beams 130a and 130b during the rotatably oscillation of the movable device 13. The upper restricting portions 194 are outside the optical path of the light deflector 100, and does not block light from the light deflector 100.

The upper restricting portions 194 are made of metal, such as gold or aluminum. The upper restricting portions 194 are not limited to the metal provided by wire bonding and may be a flexible printed circuit (FPC). The upper restricting portions 194 may be bonded with an adhesive.

As illustrated in FIG. 12, the drive beams 130a and 130b of the movable device 13 have a turning structure (i.e., a meander structure). The drive beams 130a and 130b of the movable device 13 has a turning structure, or a meandering structure, which integrates the amount of deformation of the drive beams 130a and 130b to oscillate the reflecting portion 14. Accordingly, the amount of deformation of the drive beams 130a and 130b in the Z-direction increases from the supporting part 140 toward the reflecting portion 14. In addition, the upper restricting portion 194 is curved to form a loop, which is convex upward (i.e., in the +Z-direction) in which the reflecting portion 195 reflects light, so as not to contact the driving beams 130a and 130b during the rotatably oscillation of the movable device 13.

FIG. 11B is an illustration of an overall configuration of a light deflector 100 according to a variation of the fourth embodiment. FIG. 11B is a schematic view, and the number of upper restricting portions 194' serving as a stopper is the same as the number of turnings of the turning structure (i.e., meander structure) of the drive beams 130a and 130b of the movable device 13.

With an additional acceleration produced by dropping of the light deflector 100 or an impact on the light deflector 100 due to the drop, the drive beams 130a and 130b of the movable device 13 is extended more than the usual amplitude during the rotational oscillation of the movable device 13. As illustrated in FIG. 12, however, the upper restricting portions 194 at the substantially center of the turning structure (i.e., the meander structure) prevents the drive beams 130a and 130b from being stretched beyond the limit within which the movable device 13 remains undamaged. Further, the upper restricting portions 194 lying over the turning portions of the meander structure in the +Z-direction prevents the drive beams 130a and 130b from striking the upper restricting portions 194 and also from being stretched beyond the limit within which the movable device 13 remains undamaged when an impact is applied to the movable device 13.

The configuration according to the present embodiment prevents damage to the drive beams 130a and 130b and the reflecting portion 14 of the movable device 13, and reliably increases the impact resistance of the movable device 13.

The conventional packaged light deflection element is provided with a lid transmitting light that serves to restrict the movement of the movable portion and the deformation of the drive beams so as to prevent the movable portion and the drive beams from protruding. Such a conventional structure may cause vignetting in MEMS devices that scan with light over wide angles. However, the upper restricting portions 194 restricts the movement of the movable portion 120 and the drive beams 130a and 130b to prevent the movable portion 120 and the drive beams 130a and 130b from protruding when the drive beams 130a and 130b of the light deflector 100 as a MEMS device are extended. Such upper restricting portions 194 improve the impact resistance of the movable device 13 without blocking light, and benefit a projector incorporating the light deflector 100 without causing a deterioration in light-emission patterns.

The configuration with the lower restricting portion 71c on the mount portion 70 as in FIGS. 3A and 4 and the upper restricting portions 194 on the supporting parts 140a and 140b more reliably prevent the drive beams 130a and 130b from being stretched in the Z-direction beyond the limit within which the movable device 13 remains undamaged when an impact is applied to the movable device 13, thus improving the impact resistance of the movable device 13. For the movement in the X-direction and the Y-direction, the supporting parts 140a and 140b on the same plane as the drive beams 130a and 130b in the movable device 13 serve as a deformation restricting portion to prevent the drive beams 130a and 130b from being extended or stretched in the X-direction and the Y-direction beyond the limit within which the movable device 13 remains undamaged when an impact is applied to the movable device 13.

In the present embodiment, one upper restricting portion 194 is provided for each of the supporting parts 140a and 140b. However, no limitation is intended thereby. Alternatively, two or more upper restricting portions 194 are provided for each of the supporting parts 140a and 140b.

Variation

Figure 13:
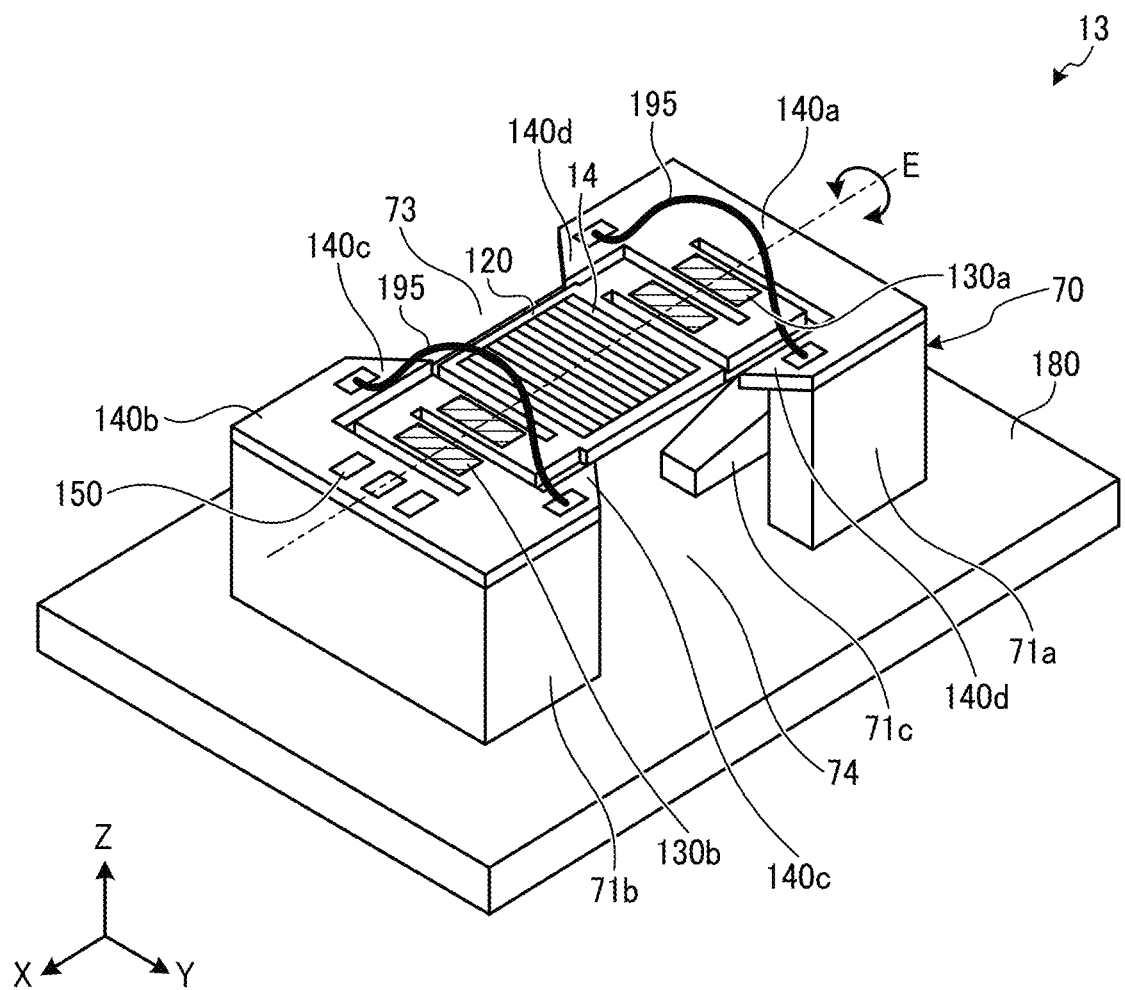
FIG. 13 is a perspective view of a light deflector according to a variation of the fourth embodiment.

FIG. 13 is an illustration of an overall configuration of a light deflector 100 according to a variation of the fourth embodiment. As illustrated in FIG. 13, wedge bonding may be employed as wire bonding. The configuration according to the present embodiment prevents damage to the drive beams 130a and 130b and the reflecting portion 14 of the movable device 13, and reliably increases the impact resistance of the movable device 13.

For the wire bonding, the ball bonding is easier to make a loop on the +Z-side, or the upper side of movable device 13 than the wedge bonding. Either one of the ball bonding and the wedge bonding is selected as appropriate according to the amplitude of the rotational oscillation of the reflecting portion 14 of the movable device 13 to determine the height of the loop of the upper restricting portions 195, which prevents the drive beams 130a and 130b from contacting the upper restricting portions.

Figure 14:
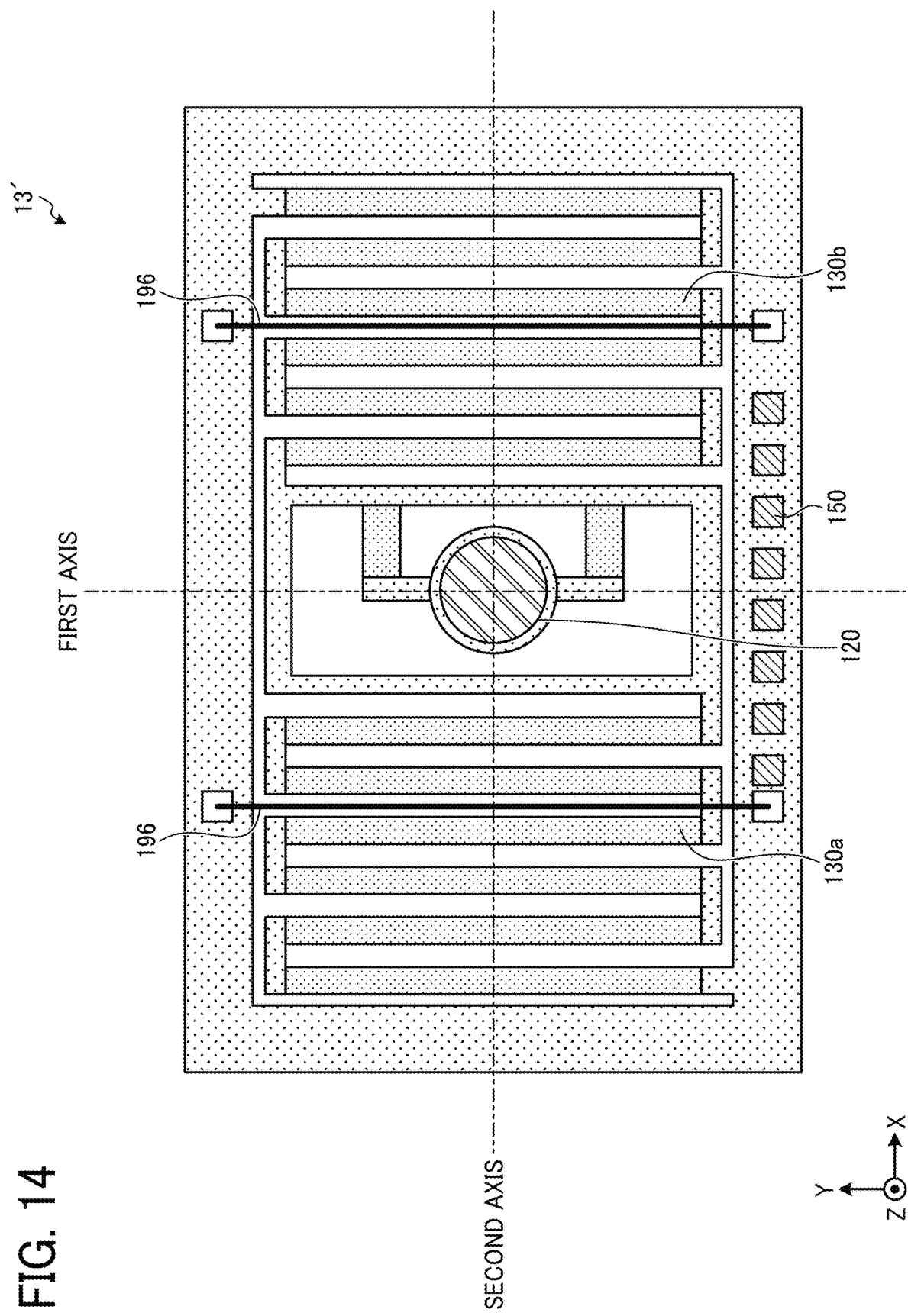
FIG. 14 is a plan view of a movable device with both-side-support beams that deflects light in two axial directions.

In the present embodiment, the movable device 13 has a both-side-support beam structure, and uniaxially deflects light. FIG. 14 is a plan view of a movable device with both-side-support beams that deflects light in two axial directions. The upper restricting portions 196 of a movable device 13' in FIG. 14 are arranged in substantially parallel to the drive beams 130a and 130b forming a meander shape and outside the optical path of the light deflector 100. The upper restricting portions 196 as a restricting portion improve the impact resistance of the movable device 13 without blocking light, and benefit a projector incorporating the light deflector 100 without causing a lower-quality image.

The upper restricting portions 196 may be arranged on the straight lines connecting the midpoints of the turning portions (e.g., the midpoint of a first turning portion and the midpoint of a second turning portion) as in FIG. 12.

Fifth Embodiment

Next, a fifth embodiment will be described.

The fifth embodiment differs from the first embodiment to the fourth embodiment in that the upper restricting portion is shaped to be lid-like. In the following description of the fifth embodiment, the description of the same portions as those of the first embodiment to the fourth embodiment is omitted, and differences from the first embodiment to the fourth embodiment are described.

Figure 15:
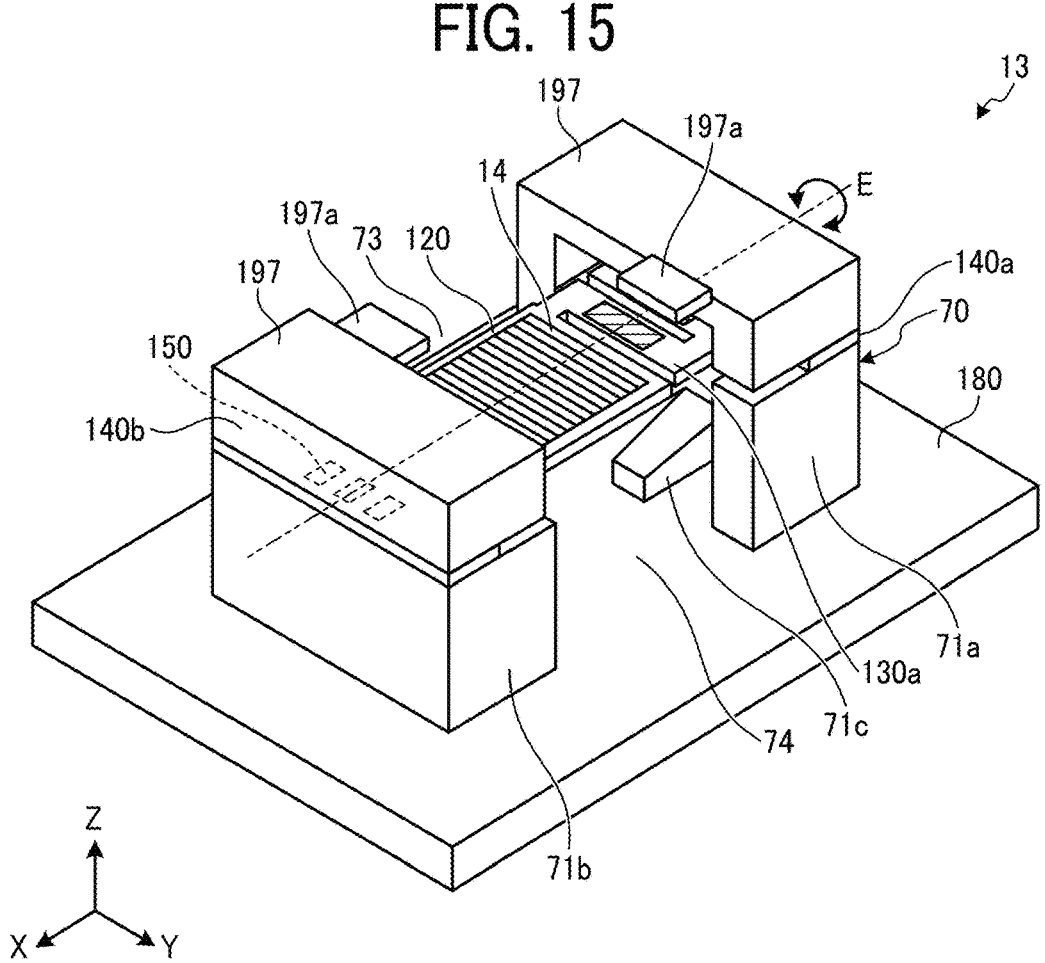
FIG. 15 is a perspective view of a light deflector according to a fifth embodiment.
Figure 16:
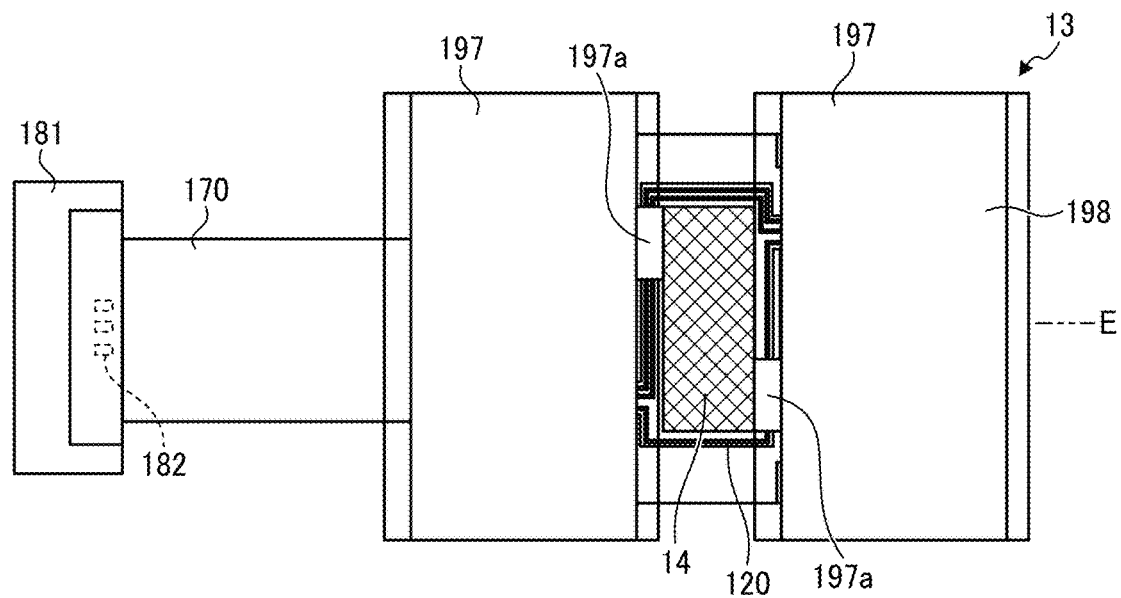
FIG. 16 is a plan view of a configuration of a movable device according to an embodiment.
Figure 17:
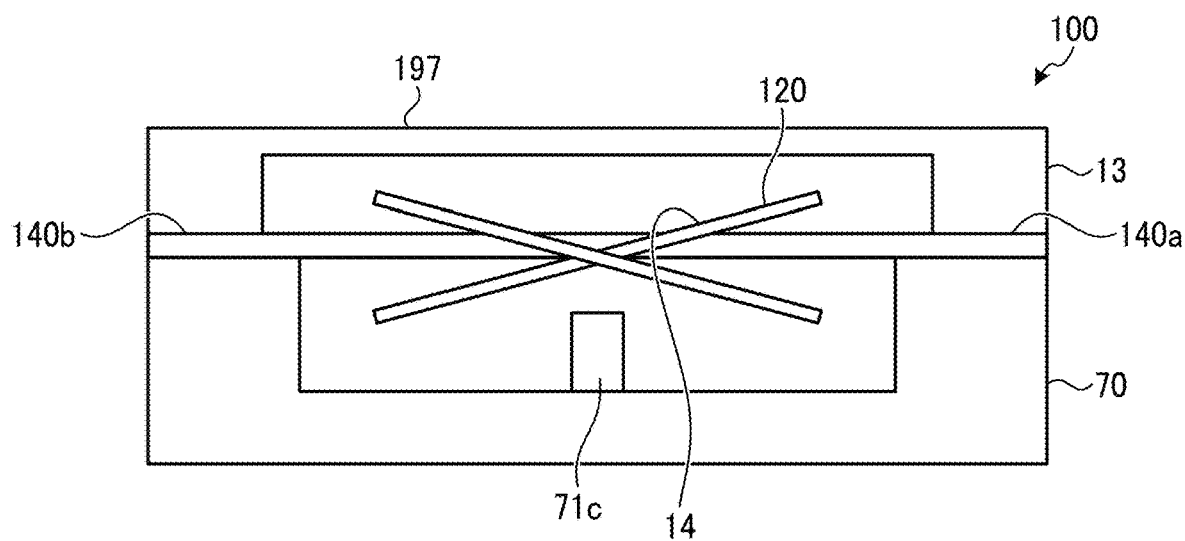
FIG. 17 is a cross-sectional view of a light deflector according to an embodiment.

FIG. 15 is a perspective view of an overall configuration of a light deflector 100 according to a fifth embodiment. FIG. 16 is a plan view of a configuration of a movable device 13 according to the fifth embodiment. FIG. 17 is a cross-sectional view of the light deflector 100 in FIG. 15.

As illustrated in FIGS. 15 to 17, the light deflector 100 includes upper restricting portions 197 that serve as a restricting portion. The upper restricting portions 197 are arranged to cover the drive beams 130a and 130b forming a meander structure in the light deflector 100.

The upper restricting portions 197 has a YX-plane shaped to be lid-like, which is an angular C-shape with an opening facing downward (i.e., −Z-direction), and is bonded to the supporting parts 140a and 140b of the movable device 13, so as not to contact the drive beams 130a and 130b and the reflecting portion 14 during the oscillation of the movable device 13.

The upper restricting portions 197 each have a projection 197a partly covering the reflecting portion 14. The projections 197a press the outer frame of the reflection portion 14 to prevent the reflection portion 14 from protruding.

The projections 197a each are arranged above a position symmetrical with the portion, at which the reflecting portion 14 is connected to the drive beams 130a or 130b, with respect to the oscillation axis-E of the movable device 13, so as to prevent the reflecting portion 14 from protruding from the movable device 13.

In the light deflector 100 according to the present embodiment, no upper restricting portions 197 is provided in a light-transmissive area where light passes through, over the reflecting portion 14 and its surrounding. The upper restricting portions 197 may be formed of material that partly transmits light, such as resin or glass. The light-transmissive area, which is made of resin or glass, is preferably of a semi-cylindrical shape with a curvature and the same center as the rotation center of the reflecting portion 14 of the movable device 13, to uniformly transmit light.

The configuration according to the present embodiment prevents the drive beams 130a and 130b and the reflecting portion 14 of the movable device 13 from protruding more reliably when an impact is applied on the movable device 13. The upper restricting portion 197 according to the present embodiment is resistant to deformation and disconnection. Further, the upper restricting portion 197 according to the present embodiment blocks only a part of the optical path of the light deflector 100, and does not cause a significant decrease in the amount of light.

Figure 18:
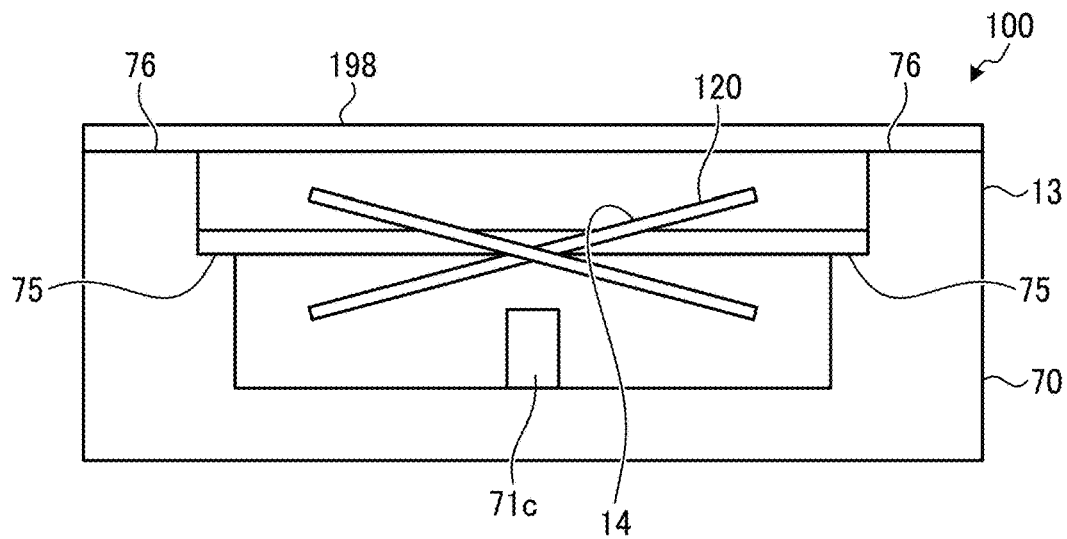
FIG. 18 is a perspective view of a light deflector according to a variation of the fifth embodiment.

Variation FIG. 18 is a perspective view of a light deflector according to a variation of the fifth embodiment. The light deflector 100 in FIG. 18 is provided with a flat-plate upper restricting portion 198 serving as a restricting portion, which covers the drive beams 130a and 130b forming a meander structure (i.e., a turning structure).

The mount portion 70 has two steps: a step 75 and another step 76 with a level higher than the step 75. The movable device 13 is joined to the step 75 lower and closer to the center of the mount portion 70 than the step 76. The upper restricting portion 198 is joined to the step 76 higher and farther to the center of the mount portion 70 than the step 75. The step 75 of the mount portion 70 restricts the height of the drive beams 130a and 130b and the reflecting portion 14, to prevent the drive beams 130a and 130b of the meandering structure (i.e., the turning structure) and the reflecting portion 14 from contacting the upper restricting portion 198 during the rotational oscillation of the movable device 13.

The upper restricting portion 198 is joined to a portion of the mount portion 70, and the portion is a single integrated supporting part in the form of a frame. However, the supporting part is not limited to the single integrated one and may be supporting parts separate from each other.

In the present embodiment, the upper restricting portion 198 is arranged to cover an area directly above the oscillation axis of the reflecting portion 14. Notably, the upper restricting portion 198 may be arranged to have its portion positioned above the connecting portion of the reflecting portion 14 and the drive beams 130a and 130b of the meander structure (i.e., the turning structure).

The configuration according to the present embodiment prevents the drive beams 130a and 130b and the reflecting portion 14 of the movable device 13 from protruding more reliably when an impact is applied on the movable device 13, and also prevent damage to the connecting portion of the reflecting portion 14 and the drive beams 130a and 130b of the meander structure (i.e., the turning structure) caused by a part of the reflecting portion 14 hitting the upper restricting portion 198. Further, the upper restricting portion 198 according to the present embodiment blocks only a part of the optical path of the light deflector 100, and does not cause a significant decrease in the amount of light.

Sixth Embodiment

Next, the sixth embodiment is described.

The sixth embodiment provides a spectrometer incorporating the light deflector 100 according to any one of the first to fifth embodiments. In the following description of the sixth embodiment, the description of the same portions as those of the first embodiment to the fifth embodiment is omitted, and differences from the first embodiment to the fifth embodiment are described.

FIG. 19 is an illustration of a system configuration of a spectrometer system 300 (e.g., a resin identification system) according to the sixth embodiment.

In FIG. 19, the spectrometer system 300 includes a spectrometer 302 that is an analyzer including the light deflector 100, and a handheld device 310. Notably, the spectrometer system 300 according to the present embodiment includes one spectrometer 302 for one handheld device 310, but no limitation is intended thereby. Alternatively, multiple spectrometer 302 are provided for one handheld device 310.

Figure 20A:
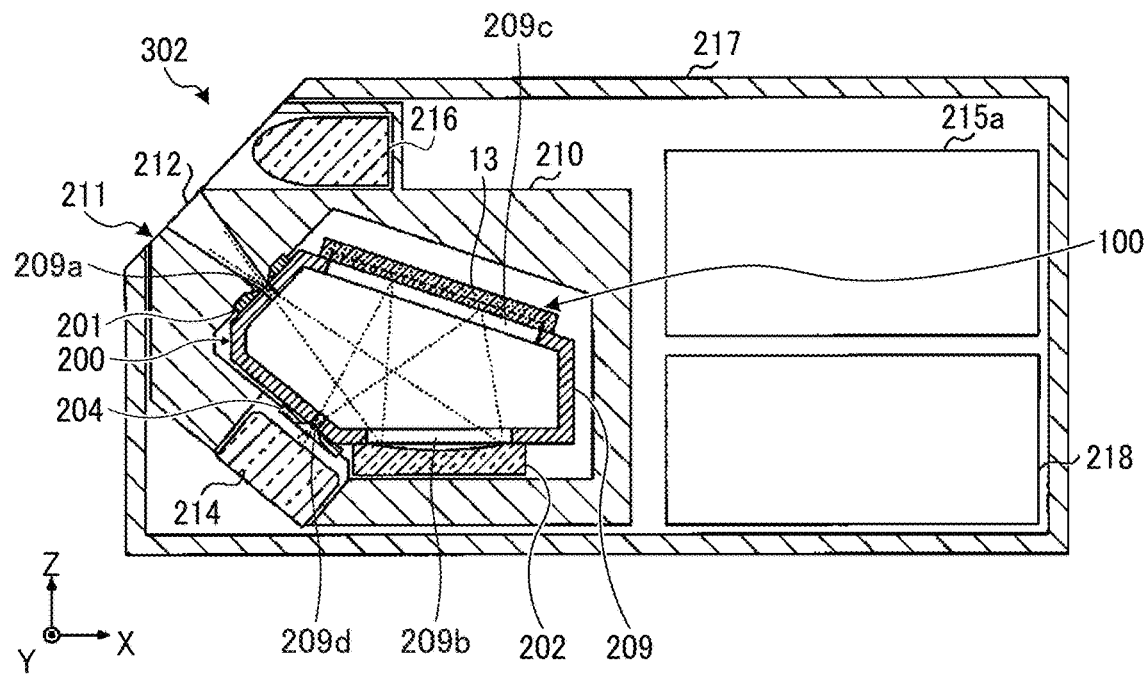
FIG. 20A is a cross-sectional view of a spectrometer according to an embodiment.

The spectrometer 302 includes an infrared spectroscopic analysis unit 320 provided with a photosensor 214 in FIG. 20A, and a processor 306 that processes output including the intensity of light temporally provided from the photosensor 214. The spectrometer 302 further includes a communication circuit 304 outputs outside information in which the output including the intensity of light is associated with the time of the spectrum processed by the processor 306.

The handheld device 310 includes an interface 314 and a processor 316. The handheld device 310 is, for example, a mobile device such as a mobile phone or a smartphone. The handheld device 310 may have a camera capability.

The processor 316 converts the time into the light wavelength based on the information in which the time of the spectrum processed by the processor 306 of the spectrometer 302 is associated with the output including the light intensity and the oscillation frequency of the movable mirror included in the spectrometer 302, to obtain the spectrum information in which the light intensity is associated with each light wavelength.

The handheld device 310 includes a display 312 that displays information on the spectrum reflected by a sample 108 and an analysis result, such as a composition-identification result of the sample 108, which are measured by the spectrometer 302.

In such a spectrometer system 300, the spectrometer 302 transmits data to the handheld device 310 via the communication circuit 304 using wireless serial communication such as, for example, Bluetooth (registered trademark). The handheld device 310 receives data from the spectrometer 302, and the processor 316 of the handheld device 310 processes and analyzes the data received. Then, the display 312 displays the analysis result (e.g., information on the spectrum of light and a composition-identification result).

Figure 20B:
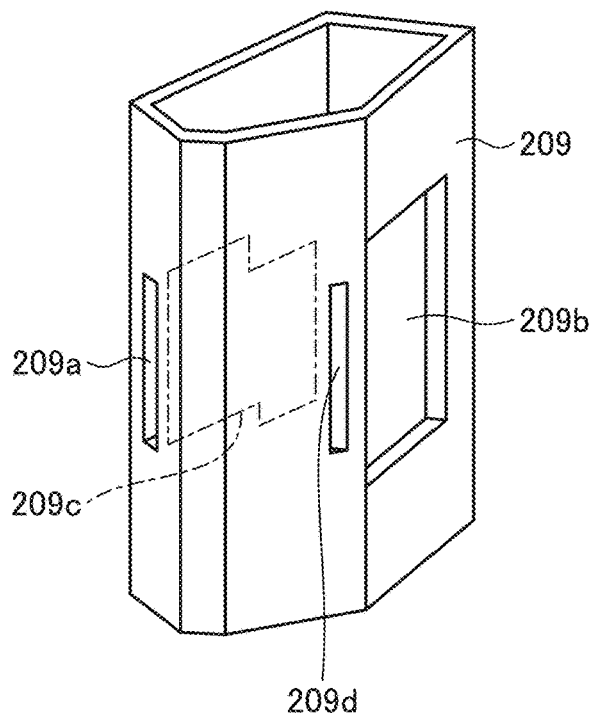
FIG. 20B is an illustration of a frame of the spectrometer in FIG. 20A.

FIG. 20A is a cross-sectional view of a spectrometer 302 according to an embodiment. FIG. 20B is an illustration of a frame 209 of the spectrometer 302 in FIG. 20A.

As illustrated in FIG. 20A, the spectrometer 302 includes a light source 216 and a processing unit 215a.

The light source 216 irradiates a sample 308 to undergo spectroscopic analysis with light in a desired wavelength range. The light source 216 is, for example, a light emitting diode (LED) or a halogen lamp. The light source 216 is disposed outside an outer frame 210. The light source 216 emits light in a proper wavelength bandwidth to an object to undergo the spectroscopic analysis.

The processing unit 215a obtains a spectrum by calculation based on the electrical signal input from the photosensor 214. In addition, the processing unit 215a controls the movable device 13 of the light deflector 100 to emit light with a desired wavelength to the photosensor 214, and further controls the light emission (e.g., the intensity of light) by the light source 216.

The spectrometer 302 includes an entrance slit 201, a concave diffraction grating 202, a movable device 13, and an exit slit 204. The dotted lines in FIG. 20 indicate portions of light incident on the spectrometer 302 and internally reflected within the spectrometer 302 before being output to the photosensor 214.

The entrance slit 201 forms a long and thin rectangular opening that guides light coming through a tapered hole 212 of the outer frame 210, into the space within the frame 209. The width of the opening of the entrance slit 201 in the short-side direction is, for example, several tens to several hundreds of micrometers. The entrance slit 201 is formed by providing a rectangular through-hole in a metal substrate made of, for example, nickel. However, the material of the substrate is not limited to metal, and may be a semiconductor or resin. The entrance slit 201 is not limited to a rectangular opening, and may be a pinhole having a circular opening. The light entering the spectrometer 302 through the entrance slit 201 strikes the concave diffraction grating 202.

The concave diffraction grating 202 is an optical element in which thin lines are formed at equal intervals on the surface of a concave metal mirror. However, the material of the base of the concave diffraction grating 202 is not limited to metal, and may be a semiconductor, glass, or resin. In the concave diffraction grating 202, the thin lines may be formed directly on the base, or may be formed on a thin resin layer on the base. The concave diffraction grating 202 serves to disperse light by the diffraction grating while serving to cause light to converge by the concave mirror. The light striking the concave diffraction grating 202 is diffracted and dispersed by the concave diffraction grating 202, and caused to converge onto the movable device 13. The dispersion of light refers to a phenomenon that separates incident light into light beams for the respective wavelength.

The movable device 13 is a micro-electromechanical system (MEMS) mirror configured such that a movable portion including a mirror is integrated with an elastic beam as a connecting portion. The mirror reflects incident light. Further, the movable portion rotates with the elastic movement of the elastic beam, which rotates the mirror surface.

The movable device 13 in FIG. 12 reflects the light dispersed by the concave diffraction grating 202 toward the exit slit 204. The reflection angle of the light reflected by the mirror of the movable portion is variable with the rotation of the movable portion having the mirror.

The exit slit 204 is a narrow rectangular opening and serves to allow the dispersed light to exit the spectrometer 302. The material and shape of the exit slit 204 may be the same as those of the entrance slit 201.

The exit slit 204 is disposed at a position (i.e., an image-forming position) at which the light dispersed by the concave diffraction grating 202 forms an image. The image-forming position of the light dispersed by the concave diffraction grating 202 laterally shifts according to the wavelength. In view of such shifting, the reflection angle of the movable device 13 is changed to change the wavelength of light passing through the exit slit 204, so as to allow light with a desired wavelength to be selected from the dispersed light and emitted to the photosensor 214. The photosensor 214 is a photoelectric conversion element such as a photodiode that outputs electrical signals carrying light information, which is to undergo the spectroscopic analysis.

The following describes the relative position of the frame 209 and the movable device 13 with reference to FIGS. 20A and 20B.

The spectrometer 302 has a frame 209. As illustrated in FIGS. 20A and 20B, the frame 209 has a prism shape having a polygonal cross section and a hollow structure with a hollow interior. The frame 209 is, but not exclusively, made of material, such as resin, metal, or ceramic. The frame 209 has rectangular openings 209a to 209d at predetermined positions on side surfaces constituting the frame 209, each opening allowing the outside of the frame 209 and the hollow interior of the frame 209 to communicate with each other.

The frame 209 includes a concave diffraction grating 202 at the opening 209b. The concave diffraction grating 202 is fixed to the outer surface of the frame 209. The light entered through the opening 209a passes through the opening 209b, and is incident on the concave diffraction grating 202 outside the frame 209. The light incident on the concave diffraction grating 202 is diffracted and dispersed by the concave diffraction grating 202, and propagates toward the opening 209c while being condensed.

A movable device 13 is arranged at the position of the opening 209c. The movable device 13 is fixed to the outer surface of the frame 209. The light dispersed by the concave diffraction grating 202 passes through the opening 209c and is incident on the movable device 13 outside the frame 209. The light incident on the mirror 7 of the movable device 13 is reflected by the reflecting portion 14 and propagates toward the opening 209d. The reflecting portion 14 of the movable device 13, rotates about the axis indicated by a dashed-dotted line in FIG. 20A within the range of the opening 209c, does not contact the frame 209 during oscillation.

The upper restricting portion 198 in FIG. 18 is equivalent to the frame 209. The upper restricting portion 197 in FIGS. 15 and 16, particularly of the portion uncovered by the upper restricting portions 197 is shaped to fit the opening 209c of the frame 209 in FIG. 20A. The reflecting portion 14 of the movable device 13 rotates about the axis indicated by a dashed-dotted line in FIG. 20A within the range of the thickness of the mount portion 70, and does not contact the frame 209 during oscillation.

Figure 20C:
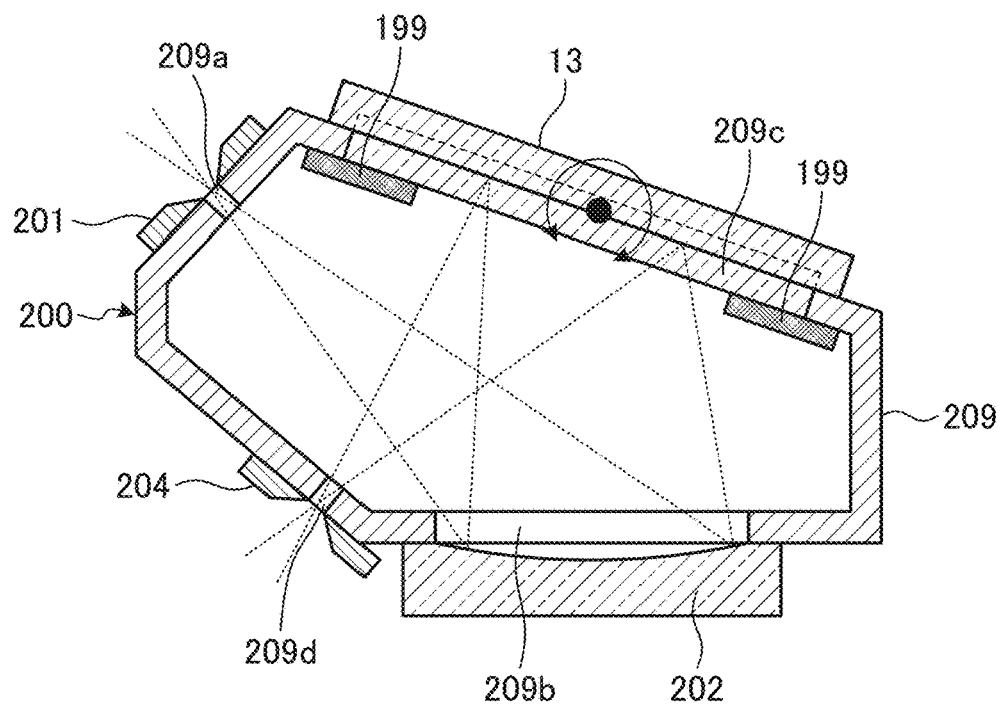
FIG. 20C is a cross-sectional view of a spectrometer according to a variation of the embodiment.
Figure 20D:
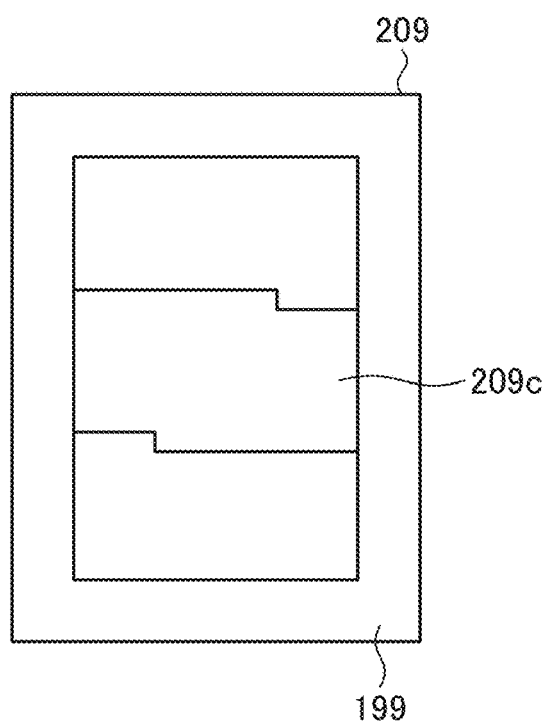
FIG. 20D is an illustration of an upper restricting portion on a frame of the spectrometer in FIG. 20C.

FIG. 20C is a cross-sectional view of a spectrometer 302 according to a variation of the embodiment. FIG. 20D is an illustration of an upper restricting portion 199 on a frame 209 of the spectrometer 302 in FIG. 20C.

As illustrated in FIGS. 20C and 20D, the spectrometer 302 includes the upper restricting portions 199 at the opposite side of the frame 209 from the movable device 13, that is, at the inside of the frame 209. The upper restricting portion 199 is shaped not to block the optical paths indicated by dotted lines in FIG. 20C. Further, the upper restricting portion 199 provided with a light transmissive portion smaller than the opening 209c is joined to the frame 209. The shape of the upper restricting portion 199 is not limited to the frame shape, and the upper restricting portion 199 may be shaped into separate parts to cover the drive beams 130a and 130b of the movable device 13, respectively.

The reflecting portion 14 of the movable device 13 rotates in the direction indicated by arrow in FIG. 2A within the range of the thickness of the frame 209, and does not contact the upper restricting portion 199 during oscillation.

In the configuration according to the embodiment in FIG. 20A, the mount portion 70 has two steps, a step 75 and another step 76 as illustrated in FIG. 18, which prevent a part of the reflecting portion 14 or the drive beams 130a and 130b from contacting the frame 209 in FIG. 20A equivalent to the upper restricting portion 198 in FIG. 18 during rotational oscillation of the reflecting portion 14. Such a mount portion 70 with the two steps is slightly more difficult to manufacture than the mount portion in FIG. 17.

In the configuration according to a variation of an embodiment as illustrated in FIGS. 20C and 20D, the mount portion 70 of a shape without any steps in FIG. 17 is used, and a flat plate without any steps and recesses is used as the upper restricting portion 199. Such mount portion 70 and upper restricting portion 199 are easy to shape and manufacture, which achieves a light deflector that is easy to assemble at lower cost.

In the present embodiment, the opening 209a is formed to position an entrance slit on the Rowland circle. Further, the opening 209b is formed to allow the concave surface of the concave diffraction grating 202 to form a part of the circumference of the Rowland circle. Such arrangement of the openings facilitates adjustment of the position and tilt of the entrance slit 201, the concave diffraction grating 202, and other components fixed to the frame 209.

In the present embodiment, the frame 209 having a polygonal cross section is used, and straight line portions connecting adjacent vertexes of the polygon are continuously connected. In other words, the frame 209 is a single integrated unit formed by combining the surfaces to which the optical elements including the concave diffraction grating 202 and the movable device 13 are fixed. This configuration reduces deformation of the bases such as the frame 209 in the spectrometer 302.

In the present embodiment, the optical elements are fixed to the outside surfaces of the frame 209, respectively. This configuration enables use of a surface-mount device such as a chip mounter used to mount electrical components onto the surfaces of a printed circuit board (PCB), so as to mount the optical elements such as the concave diffraction grating 202 and the movable device 13 on the frame 209. The use of a surface-mount device such as a chip mounter enables highly accurate alignment of optical elements, and further reduces individual differences between the spectrometers manufactured. Preferably, an inclination corrector part such as an abutting part or an alignment mark is on each surface of the frame 209, onto which the optical elements are fixed, to reduce or eliminate inclination of the optical elements during the process of mounting the optical elements.

In the present embodiment, the optical elements such as the concave diffraction grating 202 and the movable device 13 are not mounted on a primary mounting substrate, or a carrier member such as a printed circuit board, but are directly mounted on the frame 209. This arrangement prevents interference between the primary mounting substrates from limiting the proximity arrangement of the optical elements and the miniaturization of the spectrometer.

In a comparative example, the optical elements are mounted on primary mounting substrates, respectively before assembling the primary mounting substrates into a frame to form a spectrometer. This arrangement has difficulties in assembling the primary mounting substrates accurately. Further, such arrangement provides a less rigid structure formed by assembling separate substrates, which may cause deformation of the frame and thus reduce the stability of the spectrometer. However, the configuration according to the present embodiment, in which the optical elements are directly mounted on the frame 209 enables an accurate arrangement of the optical elements, and achieves a spectrometer with a higher accuracy. Further, the configuration according to the present embodiment increases rigidity of the spectrometer and thus achieves a higher stability of the spectrometer.

In the light deflector according to the present embodiment as described above, the optical elements are arranged close to each other with a higher alignment accuracy. Further, the spectrometer incorporating the light deflector according to the present embodiment achieves a reduction in size, a higher accuracy, and a higher reliability.

Seventh Embodiment

Next, a seventh embodiment is described.

The seventh embodiment provides a resin identifying sensor, or a resin identification system incorporating the spectrometer system 300 according to the sixth embodiment. In the following description of the seventh embodiment, the description of the same portions as those of the first embodiment to the sixth embodiment is omitted, and differences from the first embodiment to the sixth embodiment are described.

Used home electric appliances such as an air conditioner, a television receiver, a refrigerator, a freezer, a washing machine, and a clothes dryer are nowadays recycled. After used home electric appliances are crushed into small pieces in a home electric appliance recycling factory, they are sorted and recovered for each material type using magnetism, wind power, vibration, or the like, and are recycled as recycled materials.

Examples of the resin material include general-purpose resins such as polyethylene (PE), polypropylene (PP), polyvinyl chloride (PVC), polystyrene (PS), polyethylene terephthalate (PET), acrylonitrile butadiene styrene copolymer synthetic resin (ABS), and polycarbonate (PC). Notably, a mixture of PC and PS or a mixture of PC and ABS is also common, and is sorted and recovered for each resin type by a sorting device using the light absorption characteristics in the near-infrared region (i.e., a wavelength range of 1 to 3 µm) due to the molecular structure of the resin. Such a sorting apparatus is known to incorporate a light deflector, such as an MEMS device, to scan with a laser beam.

The spectrometer system 300 according to the present embodiment selects and displays one spectrum waveform by the handheld device 110, and can be used to identify the composition of an unknown sample simply and nondestructively.

FIG. 21 is a flowchart of a resin identifying process according to a seventh embodiment.

First, in the step S1, multiple unknown samples whose types of resins to be classified or identified are unknown are provided, for example, in a recycling operation.

In step S2, a spectrometer system 300 is provided incorporating a spectrometer 302 and a handheld device 310, in which one or more infrared material classification models (i.e., multivariable classification models).

In step S3, the spectrometer system 300 measures a sample 308 to collect raw infrared data, which is not processed yet.

In step S4, the processor 316 of the handheld device 310 performs a multivariable processing on the raw data.

In step S5, the processor 316 of the handheld device 310 identifies the composition of the sample as a particular type of resin-based composite material, which means that the composition of the sample is identified with the material mode.

In step S6, the sample 308 is further processed. For example, the sample 308 is stored in a suitable location for further recycling steps. Each process of step S1 to step S6 is repeated for a sample containing different resins in step S3.

For example, the composition of a sample containing a resin is identified using the spectrometer system 300 based on a classification model to determine a resin possibly contained in the sample containing a specific resin. For example, the recycling of resin-containing samples is based on determining the appropriate subsequent processes, such as a process of optimizing the processing conditions of the furnace used to process the material, to optimize regeneration of the material by identifying known types of resin.

In one exemplary method, the resin-based composite material comprises a carbon fiber (e.g., CRFP) that has been fired (sintered) with a resin to regenerate the carbon fiber for reuse according to known methods. An appropriate sintering temperature is determined depending on the type of resin contained in the composite material.

As described above, a resin identifying sensor incorporating the spectrometer system according to at least one embodiment achieves performance with higher reliability.

Eighth Embodiment Next, an eighth embodiment is described.

The eighth embodiment provides a distance measurement device incorporating the light deflector 100 according to any one of the first to fifth embodiments. In the following description of the eighth embodiment, the description of the same portions as those of the first embodiment to the fifth embodiment is omitted, and differences from the first embodiment to the fifth embodiment are described.

Figure 22:
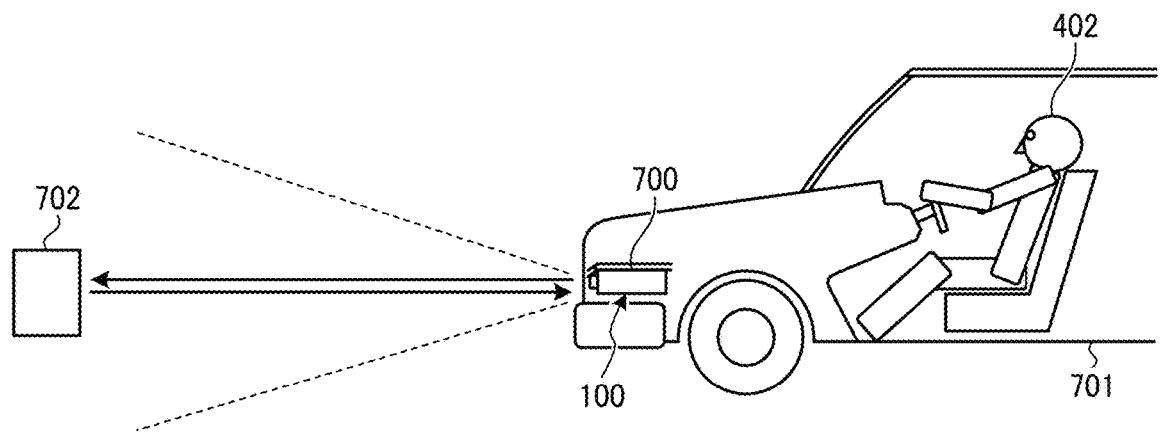
FIG. 22 is an illustration of a vehicle mounted with a laser imaging detection and ranging (LiDAR) device as an example of a distance measurement device according to an eighth embodiment.
Figure 23:
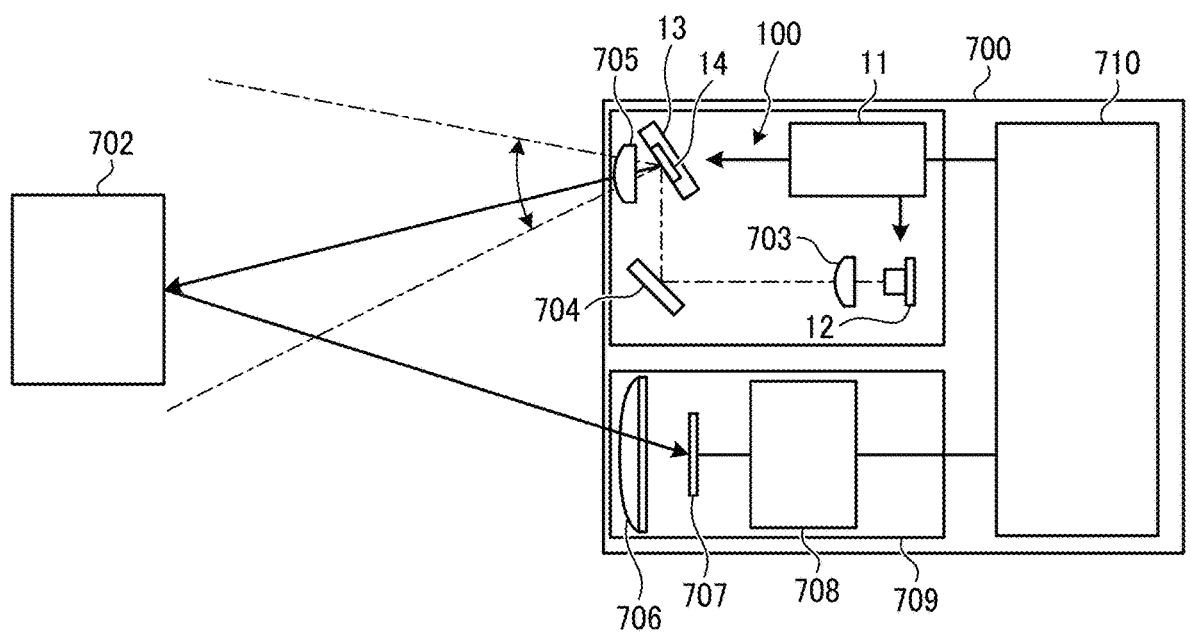
FIG. 23 is an illustration of a LiDAR device according to an embodiment mounted on the vehicle.

FIG. 22 is an illustration of a vehicle mounted with a laser imaging detection and ranging (LiDAR) device as an example of a distance measurement device according to the eighth embodiment. FIG. 23 is an illustration of a LiDAR device according to an embodiment. As an example of the distance measurement device, a LiDAR device is known that uses time-of-flight (TOF) method in which the distance to the object is measured based on the length of time it takes while the laser beams that are emitted from the laser beam source are reflected by an object and then return to the sensor. The LiDAR is typically configured to scan with a laser beam over the wide-angle range using a light deflector such as a micro-electromechanical system (MEMS) or a polygon mirror.

FIG. 22 is an illustration of a vehicle 701 mounted with a LiDAR device 700, as an example of a distance measurement device, in a lighting unit including a front light. As illustrated in FIG. 22, the LiDAR device 700 is mounted on a vehicle 701, which is an example of a mobile object, and measures the distance to an object 702 by optically scanning in a target direction and receiving light reflected from the object 702 present in the target direction.

As illustrated in FIG. 23, the laser beams emitted from a light-source device 12 pass through an incident optical system, and then are caused to perform scanning uniaxially or biaxially using the movable device 13 including the reflecting portion 14 in the light deflector 100. The incidence optical system includes a collimator lens 703 that serves as an optical system that collimates divergent beams into approximately parallel beams, and a planar mirror 704. The parallel beams are emitted to the object 702 ahead of the device, as passing through, for example, a projection lens 705 that serves as a projection optical system.

The driving of the light-source device 12 and the movable device 13 is controlled by the control device 11. The light reflected by the object 702 is detected by a photosensor 709. More specifically, the reflected light passes through, for example, a condenser lens 706 that serves as an incident-light receiving and detecting optical system, and is received by an image sensor 707. Then, the image sensor 707 outputs a detected signal to a signal processing circuit 708. The signal processing circuit 708 performs predetermined processing on the received detected signal, such as binarization or noise processing, and outputs the result to a distance measuring circuit 710.

The distance measuring circuit 710 determines whether the object 702 is present based on the time difference between the timing at which the light-source device 12 emits laser beams and the timing at which the photosensor 709 receives the laser beams or the phase difference per pixel of the image sensor 707 that have received the laser beams. Moreover, the distance measuring circuit 710 calculates distance information indicating the distance from the object 702.

The movable device 13 including the reflecting portion 14 is less likely broken and is compact compared with a polygon mirror, and thus, a highly durable and compact LiDAR device can be provided. Such a LiDAR device 700 is attached to, for example, a vehicle, an aircraft, a ship, a robot, or the like, and can perform optical scanning within a predetermined range to determine whether an obstacle is present or absent to measure the distance from the obstacle. The installation position of the LiDAR device 700 is not limited to an upper and front portion of the vehicle 701, and the LiDAR device 700 may be mounted at a side surface or a rear portion of the vehicle 701.

In the present embodiment, the LiDAR device 700 is described as an example of the distance measurement device. However, no limitation is intended thereby. The distance measuring device may be any apparatus that performs optical scanning by controlling the movable device 13 provided with the reflecting portion 14, using the control device 11, and that receives the receives the reflected laser beam using a photosensor 709 to measure the distance to the object 702.

For example, the present disclosure is also applicable to a biometric authentication apparatus, a security sensor, or a component of a three-dimensional scanner, for example. The biometric authentication apparatus performs optical scanning on a hand or face to obtain distance information, calculates object information such as the shape of the object based on the distance information, and refers to records to recognize the object. The security sensor performs optical scanning in a target range to recognize an incoming object. The three-dimensional scanner performs optical scanning to obtain distance information, calculates object information such as the shape of the object based on the distance information to recognize the object, and outputs the object information in the form of three-dimensional data.

As described above, a distance measurement device incorporating the light deflector 100 according to at least one embodiment achieves performance with higher reliability.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A light deflector comprising:
   a movable portion including a reflector;
   multiple drive beams supporting the movable portion to allow the movable portion to be oscillatable;
   at least one supporting part supporting the multiple drive beams, the at least one supporting part including a first connecting portion and a second connecting portion different from the first connecting portion; and
   a stopper having one end connected to the first connecting portion and the other end connected to the second connecting portion,
   wherein the stopper straddles at least one of the multiple drive beams,
   wherein the stopper is wire, and
   wherein the stopper is an electrical connection between the first connection portion and the second connection portion.

2. The light deflector according to claim 1, wherein the stopper includes multiple stoppers.

3. The light deflector according to claim 1, wherein the stopper is disposed not to straddle the reflector.

4. The light deflector according to claim 1, further comprising a flexible printed circuit configured to apply voltage to the movable portion,
   wherein the stopper is curved to be convex in a direction in which the reflector reflects light.

5. The light deflector according to claim 1,
   wherein the stopper is connected to the first connecting portion and the second connecting portion on the at least one supporting part by a wire bond, and
   wherein the stopper is curved to be convex in a direction in which the reflector reflects light.

6. The light deflector according to claim 5, wherein the wire bond is ball bond.

7. The light deflector according to claim 5, wherein the wire bond is wedge bond.

8. The light deflector according to claim 1,
   wherein the at least one of the multiple drive beams form a meander structure, and
   wherein the stopper lies over the meander structure in a direction in which the reflector reflects light.

9. The light deflector according to claim 8, wherein the stopper lies over a turning portion of the meander structure.

10. The light deflector according to claim 1, further comprising a mount portion on which the at least one supporting part is stationary,
    wherein the mount portion includes a lower stopper configured to restrict a movable range of the movable portion in a direction opposite to the direction in which the reflector reflects light.

11. The light deflector according to claim 10, wherein the lower stopper is disposed below the at least one of the multiple drive beams.

12. The light deflector according to claim 10, wherein the lower stopper has a sloping surface with a height decreasing from the at least one supporting part to the reflector along an oscillation axis of the movable portion.

13. The light deflector according to claim 10,
    wherein the mount portion further includes a base, and
    wherein the mount portion is a single unit in which the lower stopper is integrated with the base.

14. An analyzer comprising the light deflector according to claim 1.

15. A resin identification system comprising:
    a spectrometer including the light deflector according to claim 1 configured to acquire data on a resin; and
    a device configured to identify a composition of the resin based on the data on the resin acquired by the spectrometer.

16. A distance measurement device comprising:
    the light deflector according to claim 1 configured to emit light to an object;
    a photosensor configured to receive light reflected from the object; and
    a distance measuring circuit configured to calculate a distance to the object based on the light emitted from the light deflector and the light received by the photosensor.

17. The light deflector according to claim 2, wherein the multiple stoppers straddle the at least one of the multiple drive beams in a direction parallel to an oscillation axis of the movable portion.

18. The light deflector according to claim 2, wherein the multiple stoppers straddle the at least one of the multiple drive beams in a direction perpendicular to an oscillation axis of the movable portion.

19. The light deflector according to claim 1, wherein the stopper straddles the at least one of the multiple drive beams in a direction oblique to an oscillation axis of the movable portion.

20. The light deflector according to claim 1,
    wherein the stopper is curved to be convex in a direction in which the reflector reflects light at a central portion, and
    wherein the stopper is curved to be concave in the direction in which the reflector reflects light at at least one of the one end or the other end.

* * * * *